(12) United States Patent
Zhu et al.

(10) Patent No.: US 12,041,110 B2
(45) Date of Patent: Jul. 16, 2024

(54) BLUETOOTH COMMUNICATION METHOD AND RELATED APPARATUS

(71) Applicant: HUAWEI TECHNOLOGIES CO., LTD., Shenzhen (CN)

(72) Inventors: Yuhong Zhu, Shanghai (CN); Jiongjin Su, Shanghai (CN); Jingyun Zhang, Shanghai (CN); Guanjun Ni, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 17/640,511

(22) PCT Filed: Sep. 4, 2020

(86) PCT No.: PCT/CN2020/113428
§ 371 (c)(1),
(2) Date: Mar. 4, 2022

(87) PCT Pub. No.: WO2021/043250
PCT Pub. Date: Mar. 11, 2021

(65) Prior Publication Data
US 2022/0368754 A1    Nov. 17, 2022

(30) Foreign Application Priority Data
Sep. 6, 2019  (CN) .......................... 201910844162.6

(51) Int. Cl.
*H04L 65/80*     (2022.01)
*H04M 1/72415*   (2021.01)
(Continued)

(52) U.S. Cl.
CPC ........ *H04L 65/80* (2013.01); *H04M 1/72415* (2021.01); *H04M 1/72442* (2021.01); *H04W 4/80* (2018.02)

(58) Field of Classification Search
CPC .. H04L 65/80; H04L 65/752; H04M 1/72415; H04M 1/72442; H04M 2250/02; H04M 1/72412; H04W 4/80
See application file for complete search history.

(56) References Cited

U.S. PATENT DOCUMENTS 9,226,102 B1 * 12/2015  Singh .................... H04L 1/1621
9,826,529 B1    11/2017  Jorgovanovic
(Continued)

FOREIGN PATENT DOCUMENTS

CN    101814973 A    8/2010
CN    105430475 A    3/2016
(Continued)

*Primary Examiner* — Oanh Duong
(74) *Attorney, Agent, or Firm* — Rimon PC

(57) ABSTRACT

A Bluetooth communication method is disclosed, and relates to the field of short-range wireless communications technologies. The method includes: A terminal receives a play operation performed by a user on first audio data. The terminal sends first indication information to a Bluetooth device when a service type of the first audio data is a first service type, where the first indication information is used by the Bluetooth device to set a buffer time length for the audio data to first duration. The Bluetooth device receives the first audio data sent by the terminal via Bluetooth, and buffers the first audio data. The Bluetooth device starts to play the buffered first audio data when the buffer time length for the first audio data reaches the first duration. In this way, the terminal can perform targeted delay control on audio data playback of the Bluetooth device in different application scenarios.

14 Claims, 17 Drawing Sheets

(51) Int. Cl.
  *H04M 1/72442*  (2021.01)
  *H04W 4/80*  (2018.01)

(56) References Cited

U.S. PATENT DOCUMENTS

| | | | |
|---|---|---|---|
| 10,705,793 B1 * | 7/2020 | Young | G10L 15/22 |
| 11,720,317 B2 * | 8/2023 | Ryu | H04R 1/1025 |
| | | | 704/500 |
| 2006/0161835 A1 | 7/2006 | Panabaker et al. | |
| 2012/0045994 A1 | 2/2012 | Koh et al. | |
| 2012/0230510 A1 * | 9/2012 | Dinescu | H04R 5/033 |
| | | | 381/80 |
| 2012/0244811 A1 * | 9/2012 | Chen | H04L 65/762 |
| | | | 455/41.2 |
| 2013/0222699 A1 * | 8/2013 | Wang | H04N 21/44004 |
| | | | 348/E9.037 |
| 2015/0295982 A1 * | 10/2015 | Kafle | H04L 43/0852 |
| | | | 709/219 |
| 2017/0142535 A1 | 5/2017 | Aggarwal et al. | |
| 2017/0163707 A1 * | 6/2017 | Cui | H04L 65/764 |
| 2018/0083884 A1 * | 3/2018 | Kuang | H04L 47/6275 |
| 2019/0166553 A1 * | 5/2019 | Ryoo | H04W 76/28 |

FOREIGN PATENT DOCUMENTS

| | | | | |
|---|---|---|---|---|
| CN | 109151194 A | | 1/2019 | |
| CN | 109275129 A | * | 1/2019 | ........ H04M 1/72415 |
| CN | 109275129 A | | 1/2019 | |
| CN | 109348464 A | * | 2/2019 | ....... H04N 21/43637 |
| EP | 2615879 A1 | | 7/2013 | |
| WO | 2012022071 A1 | | 2/2012 | |

\* cited by examiner

BLUETOOTH COMMUNICATION METHOD AND RELATED APPARATUS

CROSS-REFERENCE TO RELATED APPLICATIONS

This application is a national stage of International Application No. PCT/CN2020/113428, filed on Sep. 4, 2020, which claims priority to Chinese Patent Application No. 201910844162.6, filed on Sep. 6, 2019. Both of the aforementioned applications are hereby incorporated by reference in their entireties.

TECHNICAL FIELD

This application relates to the field of short-range wireless communications technologies, and in particular, to a Bluetooth communication method and a related apparatus.

BACKGROUND

As wireless communications technologies have developed, people have become accustomed to connecting different intelligent terminal devices in a wirelessly. A Bluetooth technology, as a currently mature short-range wireless communications technology, is widely applied to intelligent terminal devices. For example, a terminal such as a smartphone is connected to a Bluetooth device such as a Bluetooth headset or a Bluetooth speaker via Bluetooth.

Currently, after a terminal such as a smartphone establishes a Bluetooth connection to a Bluetooth device such as a Bluetooth headset, a jitter occurs on a Bluetooth transmission link between the terminal and the Bluetooth device due to the impact of the environment. As a result, a data packet transmitted on the Bluetooth transmission link is lost. When the terminal plays audio data by using the Bluetooth device, to overcome the jitter on the Bluetooth transmission link, the Bluetooth device usually needs to buffer a part of data in a buffer, and then starts to play the audio data in the buffer; and at the same time the Bluetooth device continues receiving, through the Bluetooth transmission link, audio data sent by the terminal, and continues filling the buffer. However, in this case, there is a delay when the Bluetooth device plays the audio data, which affects user experience.

SUMMARY

This application provides a Bluetooth communication method and a related apparatus, to perform targeted delay control on audio data playback of the Bluetooth device in different application scenarios. This meets delay requirements for audio data playback performed by a terminal through the Bluetooth device in different scenarios, and improves user experience.

According to a first aspect, this application provides a Bluetooth communication method, applied to a Bluetooth system. The Bluetooth system includes a terminal and a Bluetooth device. The method includes: The terminal receives a play operation performed by a user on first audio data. The terminal sends first indication information to the Bluetooth device when a service type of the first audio data is a first service type, where the first indication information is used by the Bluetooth device to set a buffer time length for the audio data to a first duration. The Bluetooth device receives the first audio data sent by the terminal via Bluetooth, and buffers the first audio data. The Bluetooth device starts to play the buffered first audio data when the buffer time length for the first audio data reaches the first duration.

According to this application, the terminal can set different buffer time lengths for audio data of different service types in a buffer of the Bluetooth device based on service types of the audio data. The Bluetooth device starts to play the audio data in the buffer only when an amount of data buffered in the buffer of the Bluetooth device reaches the specified buffer time length. In this way, the terminal can perform targeted delay control on audio data playback of the Bluetooth device in different application scenarios. This meets delay requirements for audio data playback performed by the terminal through the Bluetooth device in different scenarios, and improves user experience.

In a possible implementation, after the Bluetooth device starts to play the buffered first audio data, the method further includes: The terminal receives a play operation performed by the user on second audio data. The terminal sends second indication information to the Bluetooth device when a service type of the second audio data is a second service type, where the second indication information is used by the Bluetooth device to set a buffer time length for the second audio data to second duration. When the buffer time length for the second audio data reaches the second duration, the Bluetooth device starts to play the second audio data buffered in a buffer. In this way, the Bluetooth device can set different buffer time lengths for the audio data of the different service types.

In a possible implementation, the method further includes: The Bluetooth device sends acknowledgment information to the terminal after the Bluetooth device receives the first indication information sent by the terminal. The terminal sends the audio data to the Bluetooth device via Bluetooth in response to the acknowledgment information. In this way, the terminal can send the first audio data to the Bluetooth device only after determining that the Bluetooth device has set the buffer time length for the audio data.

In a possible implementation, after the Bluetooth device starts to play the first audio data, the method further includes: When the Bluetooth device detects that transmission of the first audio data is interrupted, the Bluetooth device continues playing the buffered first audio data. In this way, the Bluetooth device can overcome a jitter on a Bluetooth transmission link by using the buffered audio data.

In a possible implementation, the method further includes: When the Bluetooth device detects that transmission of the first audio data is resumed, the Bluetooth device continues to buffer the first audio data, and continues playing the buffered first audio data. In this way, when the link resumes, the Bluetooth device can continue to buffer and continue playing the audio data.

In a possible implementation, the method further includes: When a service scenario of the first audio data is a low-delay service scenario, the terminal disables a Bluetooth packet aggregation transmission mechanism when sending the first audio data to the Bluetooth device. In this way, the Bluetooth packet aggregation transmission mechanism can be disabled, and this can reduce a transmission delay of the audio data in the low-delay service scenario.

In a possible implementation, the method further includes: When a service scenario of the first audio data is not a low-delay service scenario, the terminal enables a Bluetooth packet aggregation transmission mechanism when sending the first audio data to the Bluetooth device. In this way, when the audio data does not have a high requirement on a delay, the Bluetooth packet aggregation transmission mechanism can be enabled to preferably ensure data transmission quality.

According to a second aspect, this application provides a Bluetooth system, including a terminal and a Bluetooth device. The terminal is configured to receive a play operation performed by a user on first audio data. The terminal is further configured to send first indication information to the Bluetooth device when a service type of the first audio data is a first service type, where the first indication information is used by the Bluetooth device to set a buffer time length for the audio data to a first duration. The Bluetooth device is configured to: receive the first audio data sent by the terminal via Bluetooth, and buffer the first audio data. The Bluetooth device is further configured to start to play the buffered first audio data when the buffer time length for the first audio data reaches the first duration.

According to this application, the terminal can set different buffer time lengths for audio data of different service types in a buffer of the Bluetooth device based on service types of the audio data. The Bluetooth device starts to play the audio data in the buffer only when an amount of data buffered in the buffer of the Bluetooth device reaches the specified buffer time length. In this way, the terminal can perform targeted delay control on audio data playback of the Bluetooth device in different application scenarios. This meets delay requirements for audio data playback performed by the terminal through the Bluetooth device in different scenarios, and improves user experience.

In a possible implementation, the terminal is further configured to: after the Bluetooth device starts to play the buffered first audio data, receive a play operation performed by the user on second audio data; and send second indication information to the Bluetooth device when a service type of the second audio data is a second service type, where the second indication information is used by the Bluetooth device to set a buffer time length for the second audio data to second duration. The Bluetooth device is further configured to: when the buffer time length for the second audio data reaches the second duration, start to play the second audio data buffered in a buffer. In this way, the Bluetooth device can set different buffer time lengths for the audio data of the different service types.

In a possible implementation, the Bluetooth device is further configured to send acknowledgment information to the terminal after receiving the first indication information sent by the terminal. The terminal is further configured to send the first audio data to the Bluetooth device via Bluetooth in response to the acknowledgment information. In this way, the terminal can send the first audio data to the Bluetooth device only after determining that the Bluetooth device has set the buffer time length for the audio data.

In a possible implementation, the Bluetooth device is further configured to continue playing the buffered first audio data when it is detected that transmission of the first audio data is interrupted. In this way, when the link resumes, the Bluetooth device can continue to buffer and continue playing the audio data.

In a possible implementation, the Bluetooth device is further configured to: when it is detected that transmission of the first audio data is resumed, continue to buffer the first audio data, and continue playing the buffered first audio data.

In a possible implementation, the terminal is further configured to: when a service scenario of the first audio data is a low-delay service scenario, disable a Bluetooth packet aggregation transmission mechanism when sending the first audio data to the Bluetooth device. In this way, the Bluetooth packet aggregation transmission mechanism can be disabled, and this can reduce a transmission delay of the audio data in the low-delay service scenario.

In a possible implementation, the terminal is further configured to: when a service scenario of the first audio data is not a low-delay service scenario, enable a Bluetooth packet aggregation transmission mechanism when sending the first audio data to the Bluetooth device. In this way, when the audio data does not have a high requirement on a delay, the Bluetooth packet aggregation transmission mechanism can be enabled to preferably ensure data transmission quality.

According to a third aspect, this application provides a terminal, including a Bluetooth chip, a memory, a touchscreen, and a processor. The memory is coupled to the processor. The Bluetooth chip supports a classic Bluetooth BR/EDR function. The touchscreen is configured to receive a play operation performed by a user on first audio data. The processor is configured to: when a service type of the first audio data is a first service type, indicate the Bluetooth chip to send first indication information to a Bluetooth device, where the first indication information is used to indicate the Bluetooth device to start to play the buffered first audio data when buffer time length for the first audio data reaches first duration. The Bluetooth chip is configured to send the first audio data to the Bluetooth device.

According to this application, the terminal can set different buffer time lengths for audio data of different service types in a buffer of the Bluetooth device based on service types of the audio data. The Bluetooth device starts to play the audio data in the buffer only when an amount of data buffered in the buffer of the Bluetooth device reaches the specified buffer time length. In this way, the terminal can perform targeted delay control on audio data playback of the Bluetooth device in different application scenarios. This meets delay requirements for audio data playback performed by the terminal through the Bluetooth device in different scenarios, and improves user experience.

In a possible implementation, the touchscreen is further configured to: after the Bluetooth device starts to play the buffered first audio data, receive a play operation performed by the user on second audio data. The processor is further configured to send second indication information to the Bluetooth device when a service type of the second audio data is a second service type, where the second indication information is used to indicate the Bluetooth device to start to play the buffered second audio data when a buffer time length for the second audio data reaches the first duration.

In a possible implementation, the Bluetooth chip is further configured to: receive acknowledgment information sent by the Bluetooth device after the first indication information is received; and send the first audio data to the Bluetooth device in response to the acknowledgment information. In this way, the Bluetooth device can set different buffer time lengths for the audio data of the different service types.

In a possible implementation, the processor is further configured to: when a service scenario of the first audio data is a low-delay service scenario, indicate the Bluetooth chip to disable a Bluetooth packet aggregation transmission mechanism when the Bluetooth chip sends the first audio data to the Bluetooth device. In this way, the Bluetooth packet aggregation transmission mechanism can be disabled, and this can reduce a transmission delay of the audio data in the low-delay service scenario.

In a possible implementation, the processor is further configured to: when a service scenario of the first audio data is not a low-delay service scenario, indicate the Bluetooth chip to enable a Bluetooth packet aggregation transmission mechanism when the Bluetooth chip sends the first audio data to the Bluetooth device. In this way, when the audio data does not have a high requirement on a delay, the Bluetooth packet aggregation transmission mechanism can be enabled to preferably ensure data transmission quality.

According to a fourth aspect, this application provides a Bluetooth device, including a Bluetooth chip, a memory, and a processor. The memory is coupled to the processor. The Bluetooth chip supports a classic Bluetooth BR/EDR function. The Bluetooth chip is configured to receive first indication information sent by a terminal when the terminal identifies that a service type of first audio data is a first service type, where the first indication information is used by the processor to set a buffer time length for the first audio data to a first duration. The Bluetooth chip is further configured to: receive the first audio data sent by the terminal, and buffer the first audio data in the memory. The processor is further configured to start to play the buffered first audio data when the buffer time length for the first audio data reaches the first duration.

According to this application, the terminal can set different buffer time lengths for audio data of different service types in a buffer of the Bluetooth device based on service types of the audio data. The Bluetooth device starts to play the audio data in the buffer only when an amount of data buffered in the buffer of the Bluetooth device reaches the specified buffer time length. In this way, the terminal can perform targeted delay control on audio data playback of the Bluetooth device in different application scenarios. This meets delay requirements for audio data playback performed by the terminal through the Bluetooth device in different scenarios, and improves user experience.

In a possible implementation, the Bluetooth chip is further configured to: after the processor plays the first audio data, receive second indication information sent by the terminal, where the second indication information is used by the processor to set a buffer time length for the second audio data to second duration. The Bluetooth chip is further configured to: receive the second audio data sent by the terminal, and buffer the second audio data in the memory. The processor is further configured to start to play the buffered second audio data when the buffer time length for the second audio data reaches the second duration. In this way, the Bluetooth device can set different buffer time lengths for the audio data of the different service types.

In a possible implementation, the Bluetooth chip is further configured to send acknowledgment information to the terminal after receiving the first indication information sent by the terminal, where the acknowledgment information is used by the terminal to send the first audio data to the Bluetooth chip via Bluetooth. In this way, the terminal can send the first audio data to the Bluetooth device only after determining that the Bluetooth device has set the buffer time length for the audio data.

In a possible implementation, the processor is further configured to continue playing the buffered first audio data when it is detected that transmission of the first audio data is interrupted and after the first audio data is played. In this way, the Bluetooth device can overcome a jitter on a Bluetooth transmission link by using the buffered audio data.

In a possible implementation, the processor is further configured to: when it is detected that transmission of the first audio data is resumed, continue to buffer the first audio data, and continue playing the buffered first audio data. In this way, when the link resumes, the Bluetooth device can continue to buffer and continue playing the audio data.

According to a fifth aspect, this application provides a chip system, disposed in a terminal. The chip system includes a processor and a Bluetooth chip. The processor is configured to: respond to a play operation of the first audio data received by a touchscreen on the terminal, and when a service type of the first audio data is a first service type, indicate the Bluetooth chip to send first indication information to a Bluetooth device, where the first indication information is used to indicate the Bluetooth device to start to play the buffered first audio data when buffer time length for the first audio data reaches the first duration. The Bluetooth chip is configured to send the first audio data to the Bluetooth device.

According to this application, the terminal can set different buffer time lengths for audio data of different service types in a buffer of the Bluetooth device based on service types of the audio data. The Bluetooth device starts to play the audio data in the buffer only when an amount of data buffered in the buffer of the Bluetooth device reaches the specified buffer time length. In this way, the terminal can perform targeted delay control on audio data playback of the Bluetooth device in different application scenarios. This meets delay requirements for audio data playback performed by the terminal through the Bluetooth device in different scenarios, and improves user experience.

In a possible implementation, after the Bluetooth device starts to play the buffered first audio data, the processor is further configured to: respond to a play operation of the second audio data received by the touchscreen on the terminal, and when a service type of the second audio data is a second service type, send second indication information to the Bluetooth device, where the second indication information is used to indicate the Bluetooth device to start to play the buffered second audio data when a buffer time length for the second audio data reaches second duration. In this way, the Bluetooth device can set different buffer time lengths for the audio data of the different service types.

In a possible implementation, the Bluetooth chip is further configured to: receive acknowledgment information sent by the Bluetooth device after the first indication information is received; and send the first audio data to the Bluetooth device in response to the acknowledgment information. In this way, the terminal can send the first audio data to the Bluetooth device only after determining that the Bluetooth device has set the buffer time length for the audio data.

In a possible implementation, the processor is further configured to: when a service scenario of the first audio data is a low-delay service scenario, indicate the Bluetooth chip to disable a Bluetooth packet aggregation transmission mechanism when the Bluetooth chip sends the first audio data to the Bluetooth device. In this way, the Bluetooth packet aggregation transmission mechanism can be disabled, and this can reduce a transmission delay of the audio data in the low-delay service scenario.

In a possible implementation, the processor is further configured to: when a service scenario of the first audio data is not a low-delay service scenario, indicate the Bluetooth chip to enable a Bluetooth packet aggregation transmission mechanism when the Bluetooth chip sends the first audio data to the Bluetooth device. In this way, when the audio data does not have a high requirement on a delay, the Bluetooth packet aggregation transmission mechanism can be enabled to preferably ensure data transmission quality.

According to a sixth aspect, this application provides a chip system, disposed in a Bluetooth device. The chip system includes a processor and a Bluetooth chip. The Bluetooth chip is configured to receive first indication information sent by a terminal when the terminal identifies that a service type of first audio data is a first service type, where the first indication information is used by the processor to set a buffer time length for the first audio data to a first duration. The Bluetooth chip is further configured to: receive the first audio data sent by the terminal, and buffer the first audio data in a memory. The processor is further configured to start to play the buffered first audio data when the buffer time length for the first audio data reaches the first duration.

According to this application, the terminal can set different buffer time lengths for audio data of different service types in a buffer of the Bluetooth device based on service types of the audio data. The Bluetooth device starts to play the audio data in the buffer only when an amount of data buffered in the buffer of the Bluetooth device reaches the specified buffer time length. In this way, the terminal can perform targeted delay control on audio data playback of the Bluetooth device in different application scenarios. This meets delay requirements for audio data playback performed by the terminal through the Bluetooth device in different scenarios, and improves user experience.

In a possible implementation, the Bluetooth chip is further configured to: after the processor plays the first audio data, receive second indication information sent by the terminal, where the second indication information is used by the processor to set a buffer time length for the second audio data to second duration. The Bluetooth chip is further configured to: receive the second audio data sent by the terminal, and buffer the second audio data in the memory. The processor is further configured to start to play the buffered second audio data when the buffer time length for the second audio data reaches the second duration. In this way, the Bluetooth device can set different buffer time lengths for the audio data of the different service types.

In a possible implementation, the Bluetooth chip is further configured to send acknowledgment information to the terminal after receiving the first indication information sent by the terminal, where the acknowledgment information is used by the terminal to send the first audio data to the Bluetooth chip via Bluetooth. In this way, the terminal can send the first audio data to the Bluetooth device only after determining that the Bluetooth device has set the buffer time length for the audio data.

In a possible implementation, the processor is further configured to continue playing the buffered first audio data when it is detected that transmission of the first audio data is interrupted and after the first audio data is played. In this way, when the link resumes, the Bluetooth device can continue to buffer and continue playing the audio data.

In a possible implementation, the processor is further configured to: when it is detected that transmission of the first audio data is resumed, continue to buffer the first audio data, and continue playing the buffered first audio data. In this way, the Bluetooth packet aggregation transmission mechanism can be disabled, and this can reduce a transmission delay of the audio data in the low-delay service scenario.

DESCRIPTION OF EMBODIMENTS

The following clearly describes the technical solutions in embodiments of this application in detail with reference to the accompanying drawings. In descriptions of embodiments of this application, unless otherwise stated, "I" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The following describes an architecture of a system provided in embodiments of this application.

Figure 1:
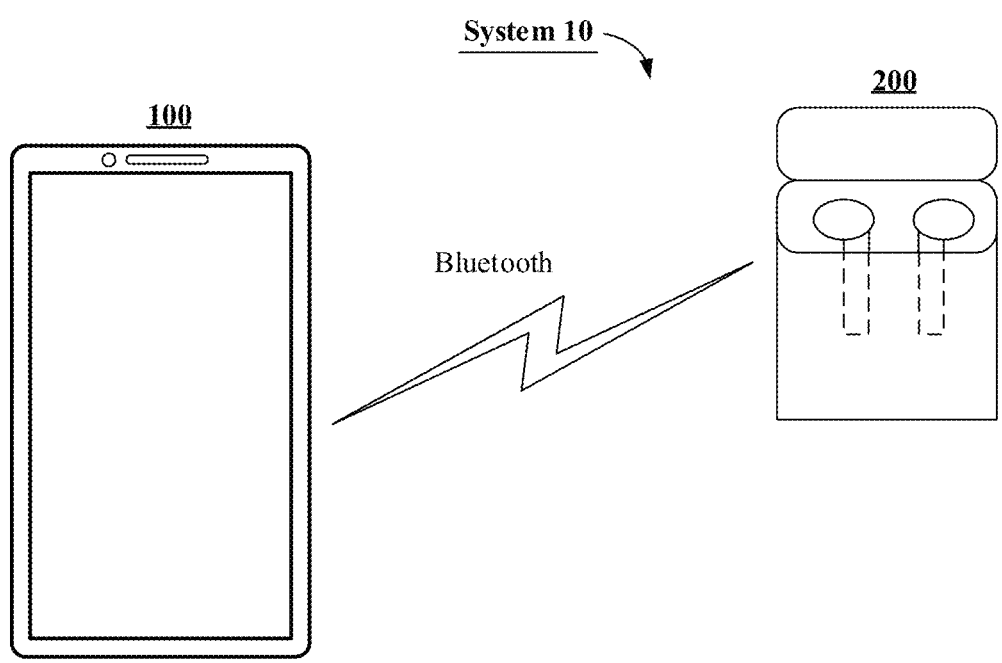
FIG. 1 is a schematic diagram of an architecture of a system according to an embodiment of this application.

Refer to FIG. 1. FIG. 1 is a schematic diagram of an architecture of a system 10 according to an embodiment of this application. As shown in FIG. 1, the system 10 may include a terminal 100 and a Bluetooth device 200.

The terminal 100 may communicate with the Bluetooth device 200 by using a Bluetooth technology (including classic Bluetooth and Bluetooth low energy (BLE)). The terminal 100 may be a terminal device such as a smartphone, a tablet computer, or a personal computer. The Bluetooth device 200 may be a device that supports a Bluetooth function, such as a Bluetooth headset, a Bluetooth speaker, or a smartwatch.

Figure 2A:
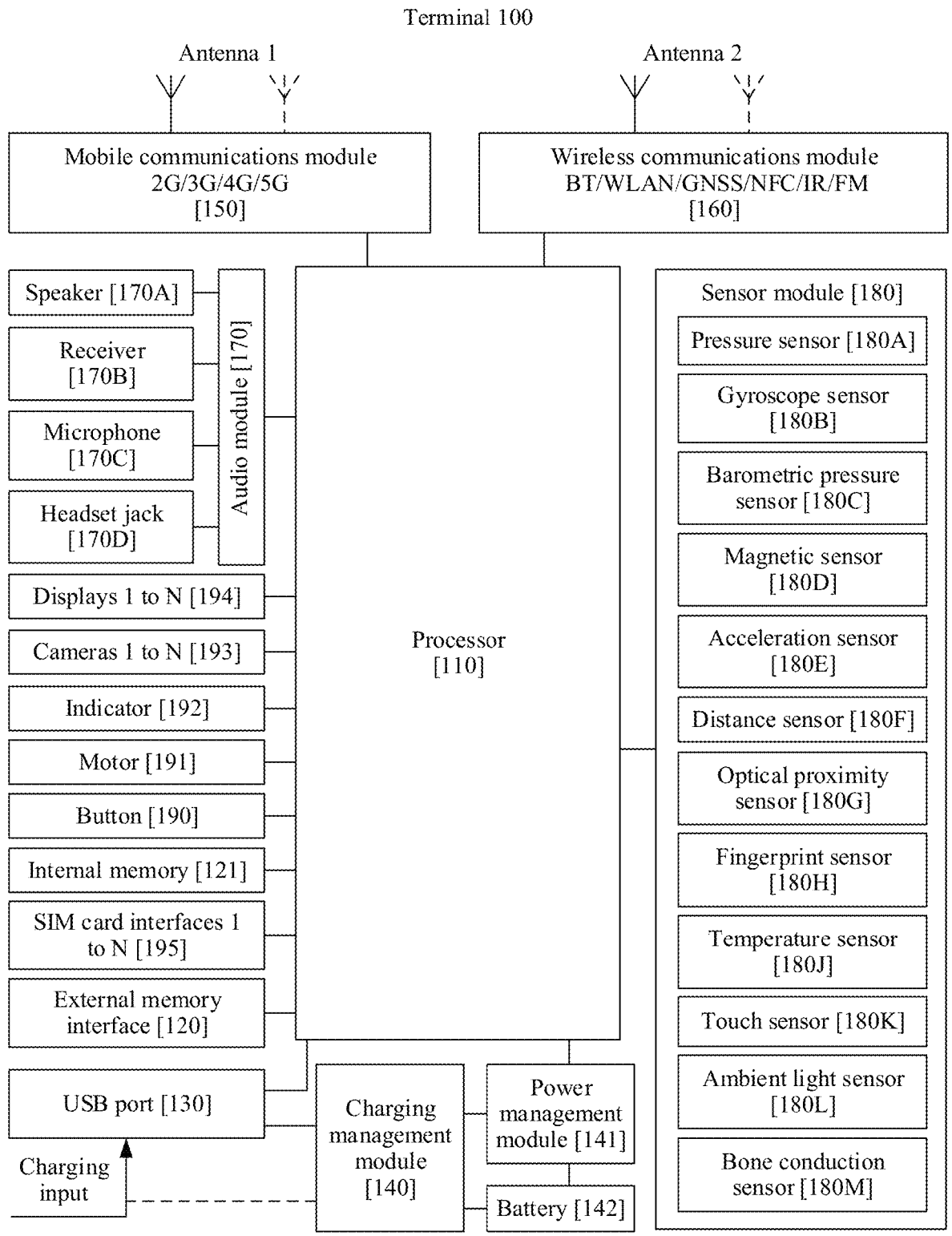
FIG. 2A is a schematic diagram of a structure of a terminal according to an embodiment of this application.

FIG. 2A is a schematic diagram of a structure of the terminal 100.

The terminal 100 is used as an example below to describe the embodiments in detail. It should be understood that the terminal 100 shown in FIG. 2A is merely an example, and the terminal 100 may have more or fewer components than components shown in FIG. 2A, may combine two or more components, or may have different component configurations. Components shown in figure may be implemented in hardware, software, or a combination of hardware and software that includes one or more signal processing and/or application-specific integrated circuits.

The terminal 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the illustrated structure in the embodiment of the present invention does not constitute a specific limitation on the terminal 100. In some other embodiments of this application, the terminal 100 may include more or fewer components than those shown in the figure, or combine some components, or split some components, or have different component arrangements. The components shown in the figure may be implemented in hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the terminal 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, including a serial data line (SDL) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface to implement a touch function of the terminal 100.

The I2S interface may be used to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using the Bluetooth headset. Both the I2S interface and the PCM interface may be used to perform audio communication.

The UART interface is a universal serial data bus, and is used to perform asynchronous communication. The bus may be a two-way communications bus. The bus switches to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using the Bluetooth headset.

The MIPI interface may be used to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photography function of the terminal 100. The processor 110 communicates with the display 194 through the DSI interface, to implement a display function of the terminal 100.

The GPIO interface may be configured by using software. The GPIO interface may be configured as a control signal or a data signal. In some embodiments, the GPIO interface may be used to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB port 130 is a port that complies with a USB standard specification, and may be specifically a mini USB port, a micro USB port, a USB type-C port, or the like. The USB port 130 may be used to connect to a charger to charge the terminal 100, and may also be used to transmit data between the terminal 100 and a peripheral device. The USB port 130 may alternatively be used to connect to a headset, to play audio by using the headset. The port may be further used to connect to another terminal such as an AR device.

It may be understood that an interface connection relationship between the modules that is shown in this embodiment of the present invention is merely an example for description, and does not constitute a limitation on the structure of the terminal 100. In some other embodiments of this application, the terminal 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input by using a wireless charging coil of the terminal 100. When charging the battery 142, the charging management module 140 may further supply power to the terminal by using the power management module 141.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communications function of the terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal 100 may be configured to cover one or more communications frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution for wireless communication that includes 2G, 3G, 4G, 5G, and the like and that is applied to the terminal 100. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then a processed low-frequency baseband signal is transferred to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same component with the mobile communications module 150 or another function module.

The wireless communications module 160 may provide a solution for wireless communication that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the terminal 100. The wireless communications module 160 may be one or more components that integrate at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal 100 implements the display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal 100 may include one or N displays 194, where N is a positive integer greater than 1.

The terminal 100 can implement a photography function by using the ISP, the camera 193, the video codec, the GPU, the display 194, the application processor, and the like.

The ISP is configured to process data fed back by the camera 193. For example, during photography, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photography scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the terminal 100 may include one or N cameras 193, where N is a positive integer greater than 1.

The digital signal processor is configured to process a digital signal, and may process another digital signal in addition to the digital image signal. For example, when the terminal 100 selects a frequency, the digital signal processor is configured to perform Fourier transform, and the like on frequency energy.

The video codec is configured to compress or decompress a digital video. The terminal 100 may support one or more video codecs. In this way, the terminal 100 can play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the terminal 100 may be implemented by using the NPU, for example, image recognition, facial recognition, speech recognition, and text understanding.

The external memory interface 120 may be used to be connected to an external storage card such as a micro SD card, to extend a storage capability of the terminal 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instruction stored in the internal memory 121, to implement various function applications and data processing of the terminal 100. The internal memory 121 may include a program storage area and a data storage area. The program storage area may store an operating system, an application required by at least one function (for example, a sound playing function or an image playing function), and the like. The data storage area may store data (for example, audio data and an address book) created during use of the terminal 100, and the like. In addition, the internal memory 121 may include a high-speed random access memory, and may further include a nonvolatile memory, for example, at least one magnetic disk storage device, a flash memory, and a universal flash storage (UFS).

The terminal 100 can implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The terminal 100 may listen to music by using a speaker 170A, or listen to a hands-free call.

The receiver 170B, also referred to as an "earpiece", is configured to convert an audio electrical signal into a sound signal. When a call is answered or audio information is listened to by using the terminal 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, further identify a sound source, implement a directional recording function, and the like.

The headset jack 170D is configured to connect to a wired headset. The headset jack 170D may be a USB port 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure strength based on a capacitance change. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed at a same touch position but have different touch operation strength may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to the first pressure threshold is performed on a Messages icon, an instruction for creating an SMS message is executed.

The gyroscope sensor 180B may be configured to determine a moving posture of the terminal 100. In some embodiments, angular velocities of the terminal 100 around three axes (namely, x, y, and z axes) may be determined by using the gyroscope sensor 180B. The gyroscope sensor 180B may be configured to perform image stabilization during photography. For example, when the shutter is opened, the gyroscope sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the terminal 100 calculates an altitude by using a barometric pressure value measured by the barometric pressure sensor 180C, to assist positioning and navigation.

The magnetic sensor 180D includes a Hall effect sensor. The terminal 100 may detect opening and closing of a flip leather case by using the magnetic sensor 180D. In some embodiments, when the terminal 100 is a flip phone, the terminal 100 may detect, by using the magnetic sensor 180D, whether a flip cover is opened or closed, and further set, based on a detected opened or closed state of the leather case or the flip cover, a feature such as automatic unlocking of the flip cover.

The acceleration sensor 180E may detect values of accelerations in various directions (usually on three axes) of the terminal 100. When the terminal 100 is still, a value and a direction of gravity may be detected. The acceleration sensor 180E may be further configured to identify a terminal posture, and is applied to applications such as screen switching between landscape and portrait modes and a pedometer.

The distance sensor 180F is configured to measure a distance. The terminal 100 may measure a distance through infrared light or a laser. In some embodiments, the terminal 100 may use the distance sensor 180F to measure a distance, to implement fast focusing in a photography scenario.

The optical proximity sensor 180G may include, for example, a light-emitting diode (LED) and an optical detector such as a photodiode. The light-emitting diode may be an infrared light emitting diode. The terminal 100 emits infrared light by using the light emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen to save power. The optical proximity sensor 180G may also be used in a leather case mode or a pocket mode to automatically unlock or lock the screen.

The ambient light sensor 180L is configured to sense ambient light brightness. The terminal 100 may adaptively adjust brightness of the display 194 based on the sensed ambient light brightness. The ambient light sensor 180L may also be configured to automatically adjust a white balance during photography. The ambient light sensor 180L may also cooperate with the optical proximity sensor 180G to detect whether the terminal 100 is in a pocket to prevent a false touch.

The fingerprint sensor 180H is configured to collect a fingerprint. The terminal 100 may use a feature of the collected fingerprint to implement fingerprint-based unlocking, application lock access, fingerprint-based photography, fingerprint-based call answering, and the like.

The temperature sensor 180J is configured to detect a temperature. In some embodiments, the terminal 100 executes a temperature processing policy by using a temperature detected by the temperature sensor 180J. For example, when the temperature reported by the temperature sensor 180J exceeds a threshold, the terminal 100 lowers performance of a processor located near the temperature sensor 180J, to reduce power consumption to implement thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may also be disposed on a surface of the terminal 100 in a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be used for an incoming call vibration prompt, or may be used for a touch vibration feedback. For example, touch operations performed on different applications (for example, photography and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator lamp, and may be configured to indicate a charging status and a power change, or may be configured to indicate a message, a missed call, a notification, and the like.

The SIM card interface 195 is used to connect to a SIM card. The SIM card may be inserted into the SIM card interface 195 or plugged from the SIM card interface 195, to implement contact with or separation from the terminal 100. The terminal 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type, or may be of different types. The SIM card interface 195 is applicable to different types of SIM cards. The SIM card interface 195 may also be compatible with the external storage card. The terminal 100 interacts with a network via a SIM card, to implement functions such as calling and data communication. In some embodiments, the terminal 100 uses an eSIM, namely, an embedded SIM card. The eSIM card may be embedded in the terminal 100, and cannot be separated from the terminal 100.

Figure 2B:
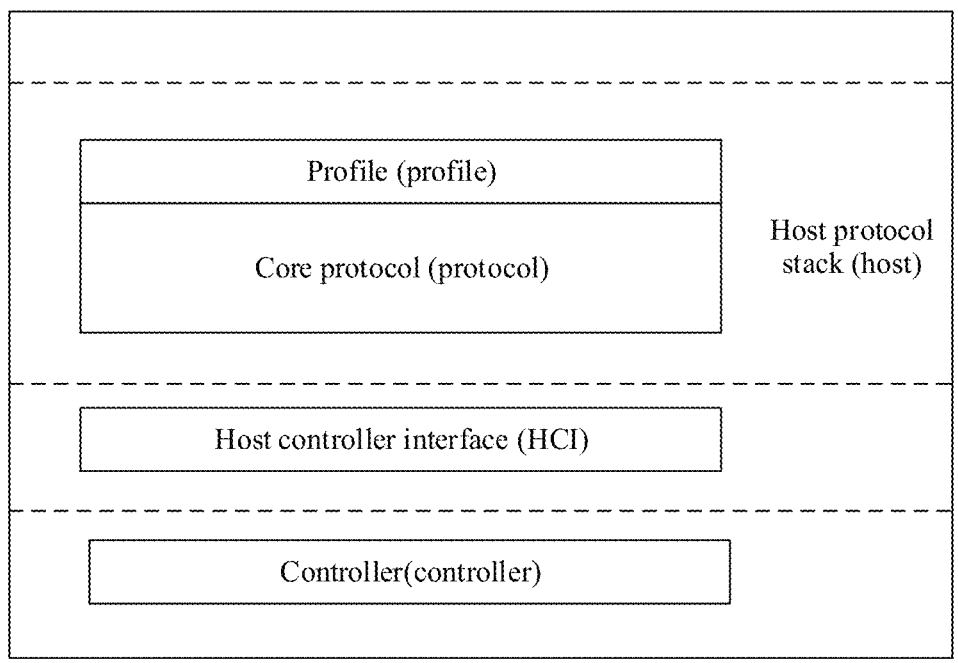
FIG. 2B is a schematic diagram of a Bluetooth protocol architecture according to an embodiment of this application.

FIG. 2B shows a Bluetooth protocol framework according to an embodiment of this application. The Bluetooth protocol framework includes but is not limited to a host protocol stack, a host controller interface (HCI), and a controller.

The host protocol stack defines a plurality of profiles and core protocols in a Bluetooth framework, each profile defines a corresponding message format and application rule, and the profile is a Bluetooth service (Application). A Bluetooth protocol has formulated specifications for various possible and universal application scenarios, for example, an advanced audio distribution profile (A2DP), and a hands-free profile (HFP), to implement interconnection and interworking between different devices on different platforms.

The core protocols include but are not limited to a Bluetooth basic service protocol (SDP), a logical link control and adaptation protocol (L2CAP), and the like. The core protocols are essential to the Bluetooth protocol stack.

The HCI provides an upper-layer protocol with a unified interface for entering a link manager and a unified manner for entering a baseband. There are several transport layers between the host core protocol stack and the controller. These transport layers are transparent and complete a task of transmitting data. The Bluetooth special interest group (SIG) defines four physical bus modes to connect to hardware, that is, four HCI transport layers: USB, RS232, UART, and PC card.

The controller defines a bottom-layer hardware part, including a radio frequency (RF), a baseband (BB), and a link manager (LM). An RF layer filters and transmits data bit streams by using microwaves on a 2.4 GHz unlicensed ISM band, and mainly defines conditions that a Bluetooth transceiver needs to meet to work normally on this frequency band. The baseband is responsible for frequency hopping and transmission of Bluetooth data and information frames. The link manager is responsible for connection, establishment, and disconnection of links, and security control. A link manager (LM) layer is a link management layer protocol of the Bluetooth protocol stack, and is responsible for translating an upper-layer HCI command into an operation acceptable to the baseband, establishing an asynchronous connection-oriented link (ACL) and a synchronous connection-oriented/extended (SCO) link, enabling a Bluetooth device to enter a working mode of an energy-saving state, and the like. A link control (LC) layer is responsible for responding to an upper-layer LM command (for example, executing LM commands for functions such as establishing a transmission link of a data packet and maintaining the link) during transmission of a batch of data packets.

The method in the embodiments of this application may be implemented by the wireless communications module 160 of the terminal 100 shown in FIG. 2A, and may be specifically performed by a Bluetooth module or a Bluetooth chip.

Figure 3:
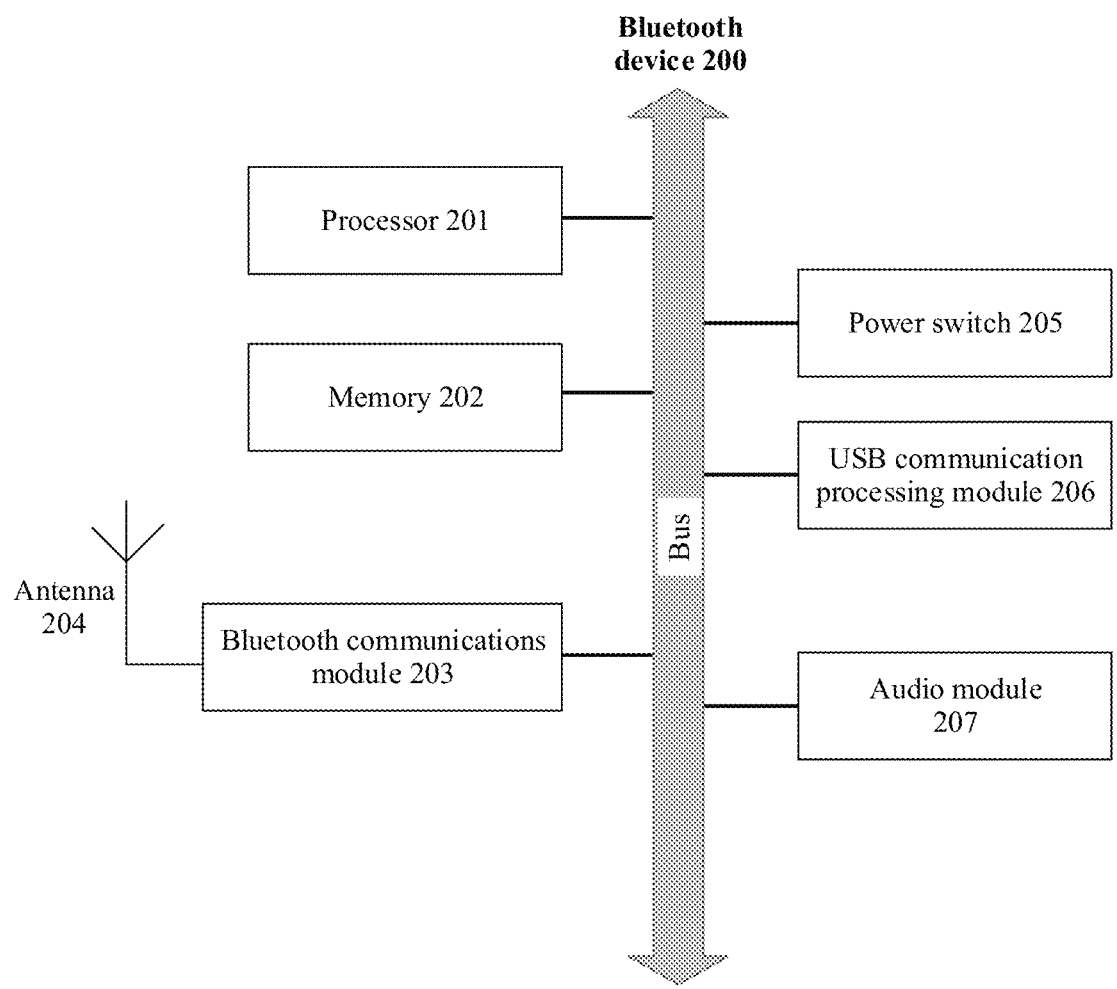
FIG. 3 is a schematic diagram of a structure of a Bluetooth device according to an embodiment of this application.

FIG. 3 is a schematic diagram of an example of a structure of a Bluetooth device 200 according to an embodiment of this application.

The following uses the Bluetooth device 200 as an example to describe the embodiments in detail. It should be understood that the Bluetooth device 200 shown in FIG. 3 is merely an example, and the Bluetooth device 200 may have more or fewer components than components shown in FIG. 3, may combine two or more components, or may have different component configurations. Components shown in figure may be implemented in hardware, software, or a combination of hardware and software that includes one or more signal processing and/or application-specific integrated circuits.

As shown in FIG. 3, the Bluetooth device 200 may include a processor 201, a memory 202, a Bluetooth communications module 203, an antenna 204, a power switch 205, a USB communication processing module 206, and an audio module 207. The processor 201 may be configured to read and execute a computer-readable instruction.

During specific implementation, the processor 201 may mainly include a controller, a calculator, and a register. The controller is mainly responsible for decoding an instruction, and sends a control signal for an operation corresponding to the instruction. The calculator is mainly responsible for storing a register operand, an intermediate operation result, and the like that are temporarily stored during instruction execution. In specific implementation, a hardware architecture of the processor 201 may be an application-specific integrated circuit (ASIC) architecture, an MIPS architecture, an ARM architecture, an NP architecture, or the like.

In some embodiments, the processor 201 may be configured to parse a signal received by the Bluetooth communication processing module 203, for example, a pairing mode modification request sent by the terminal 100. The processor 201 may be configured to perform a corresponding processing operation based on a parsing result, for example, generate a pairing mode modification response.

The memory 202 is coupled to the processor 201, and is configured to store various software programs and/or a plurality of sets of instructions. During specific implementation, the memory 202 may include a high-speed random access memory, and may also include a nonvolatile memory such as one or more disk storage devices, a flash device, or another nonvolatile solid-state storage device. The memory 202 may store an operating system, for example, an embedded operating system such as uCOS, VxWorks, or RTLinux. The memory 202 may further store a communication program, and the communication program may be used to communicate with the terminal 100, one or more servers, or another device.

The Bluetooth communications module 203 may include a classic Bluetooth (BT) module and a Bluetooth low energy (BLE) module.

In some embodiments, the Bluetooth communications module 203 may obtain, through listening, a signal transmitted by another device (for example, the terminal 100), such as a probe request or a scanning signal, and may send a response signal or a scanning response, so that the other device (for example, the terminal 100) can discover the Bluetooth device 200. Then, the Bluetooth communications module 203 establishes a wireless communication connection to the other device (for example, the terminal 100) and communicates with the another device (for example, the terminal 100) via Bluetooth.

In some other embodiments, the Bluetooth communications module 203 may also transmit a signal, for example, a broadcast BLE signal, so that another device (for example, the terminal 100) can discover the Bluetooth device 200; and establishes a wireless communication connection to the other device (for example, the terminal 100) and communicates with the another device (for example, the terminal 100) via Bluetooth.

A wireless communications function of the Bluetooth device 200 may be implemented by using the antenna 204, the Bluetooth communications module 203, a modem processor, or the like.

The antenna 204 may be configured to transmit and receive electromagnetic wave signals. Each antenna in the Bluetooth device 200 may be configured to cover one or more communications frequency bands.

In some embodiments, the Bluetooth communications module 203 may have one or more antennas.

The power switch 205 may be configured to control a power supply to supply power to the Bluetooth device 200.

The USB communication processing module 206 may be configured to communicate with another device through a USB port (not shown).

The audio module 207 may be configured to output an audio signal through an audio output interface, so that the Bluetooth device 200 can support audio playing. The audio module may be further configured to receive audio data through an audio input interface. The Bluetooth device 200 may be a media playback device such as a Bluetooth headset.

In some embodiments, the Bluetooth device 200 may further include a display (not shown). The display may be configured to display an image, prompt information, and the like. The display may be a liquid crystal display (LCD), an organic light-emitting diode (OLED) display, an active-matrix organic light emitting diode (AMOLED) display, a flexible light-emitting diode (FLED) display, a quantum dot light emitting diode (QLED) display, or the like.

In some embodiments, the Bluetooth device 200 may further include a serial interface such as an RS-232 interface. The serial interface may be connected to another device, for example, an audio speaker device such as a sound box, so that the Bluetooth device 200 collaborates with the audio speaker device to play audio and a video.

It may be understood that the structure shown in FIG. 3 does not constitute any specific limitation on the Bluetooth device 200. In some other embodiments of this application, the Bluetooth device 200 may include more or fewer components than those shown in the figure, or combine some components, or split some components, or have different component arrangements. The components shown in the figure may be implemented in hardware, software, or a combination of software and hardware.

In the method described in embodiments of this application, for a Bluetooth protocol framework used by the Bluetooth device, refer to FIG. 2B. Details are not described herein again.

In the related technology, after a terminal 100 establishes a Bluetooth connection to a Bluetooth device, the terminal 100 may continuously send, through a Bluetooth transmission link, audio data to the Bluetooth device 200 for playing. When the terminal 100 transmits the audio data through the Bluetooth transmission link, a jitter may occur on the Bluetooth transmission link due to the impact of the ambient environment. In other words, time spent by the terminal 100 on sending audio data packets to the Bluetooth device 200 through the Bluetooth transmission link varies. For example, when there is interference from a Wi-Fi signal between the terminal 100 and the Bluetooth device 200, the quality of the Bluetooth transmission link deteriorates, and a data packet needs to be retransmitted for a plurality of times before reaching a receive end. Consequently, a transmission jitter occurs. Therefore, when the terminal 100 just starts to transmit the audio data to the Bluetooth device 200, the Bluetooth device 200 does not immediately start to play the audio data when initially receiving the audio data, but buffers the received audio data in a buffer. When audio data in the buffer reaches a specified amount of data, the Bluetooth device 200 starts to play the audio data in the buffer. At the same time, the Bluetooth device 200 continues receiving the audio data sent by the terminal 100 and buffers the audio data in the buffer.

In the related technology, the Bluetooth device 200 starts to play the audio data after buffering the audio data of the specified data amount in the buffer. In this way, although a jitter on the Bluetooth transmission link can be alleviated, there is a delay when the Bluetooth device 200 plays the audio data. In some scenarios, for example, the Bluetooth connection has been established between the terminal 100 and the Bluetooth device 200. When the terminal 100 runs a game application, the terminal 100 may send, through the Bluetooth transmission link, audio data generated when the game application is run to the Bluetooth device 200 for playing. Because when the terminal 100 runs the game application, a user more needs to hear a sound synchronized with an image displayed on the terminal 100, the Bluetooth device 200 needs to have a low delay when playing the audio data. If the Bluetooth device 200 buffers sufficient audio data in the buffer to overcome a link jitter, the delay for playing the audio data by the Bluetooth device 200 is inevitably increased. As a result, this is not applicable to a scenario in which the low delay is required. In some other scenarios, for example, the Bluetooth connection has been established between the terminal 100 and the Bluetooth device 200. When the terminal 100 runs a music application to play music by using the Bluetooth device 200, the terminal 100 may send, through the Bluetooth transmission link, audio data generated when the music application is run to the Bluetooth device 200 for playing. Because a user is not sensitive to a delay when the terminal 100 runs the music application, the user pays more attention to continuity of sounds output by the Bluetooth device 200. If the Bluetooth device 200 does not buffer sufficient audio data in the buffer to reduce the delay, when the Bluetooth device 200 plays the audio data, if a jitter occurs on the Bluetooth transmission link, sounds output when the Bluetooth device 200 plays the audio data may be intermittent, which affects user experience.

Therefore, the embodiments of this application provide a Bluetooth communication method. A terminal 100 can set different buffer time lengths for audio data of different service types in a buffer of a Bluetooth device 200 based on service types of the audio data. The Bluetooth device 200 starts to play the audio data in the buffer only when an amount of data buffered in the buffer of the Bluetooth device 200 reaches the specified buffer time length. In this way, the terminal 100 can perform targeted delay control on audio data playback of the Bluetooth device 200 in different application scenarios. This meets delay requirements for audio data playback performed by the terminal 100 through the Bluetooth device 200 in different scenarios, and improves user experience.

The following describes the Bluetooth communication method provided in this application.

Figure 4:
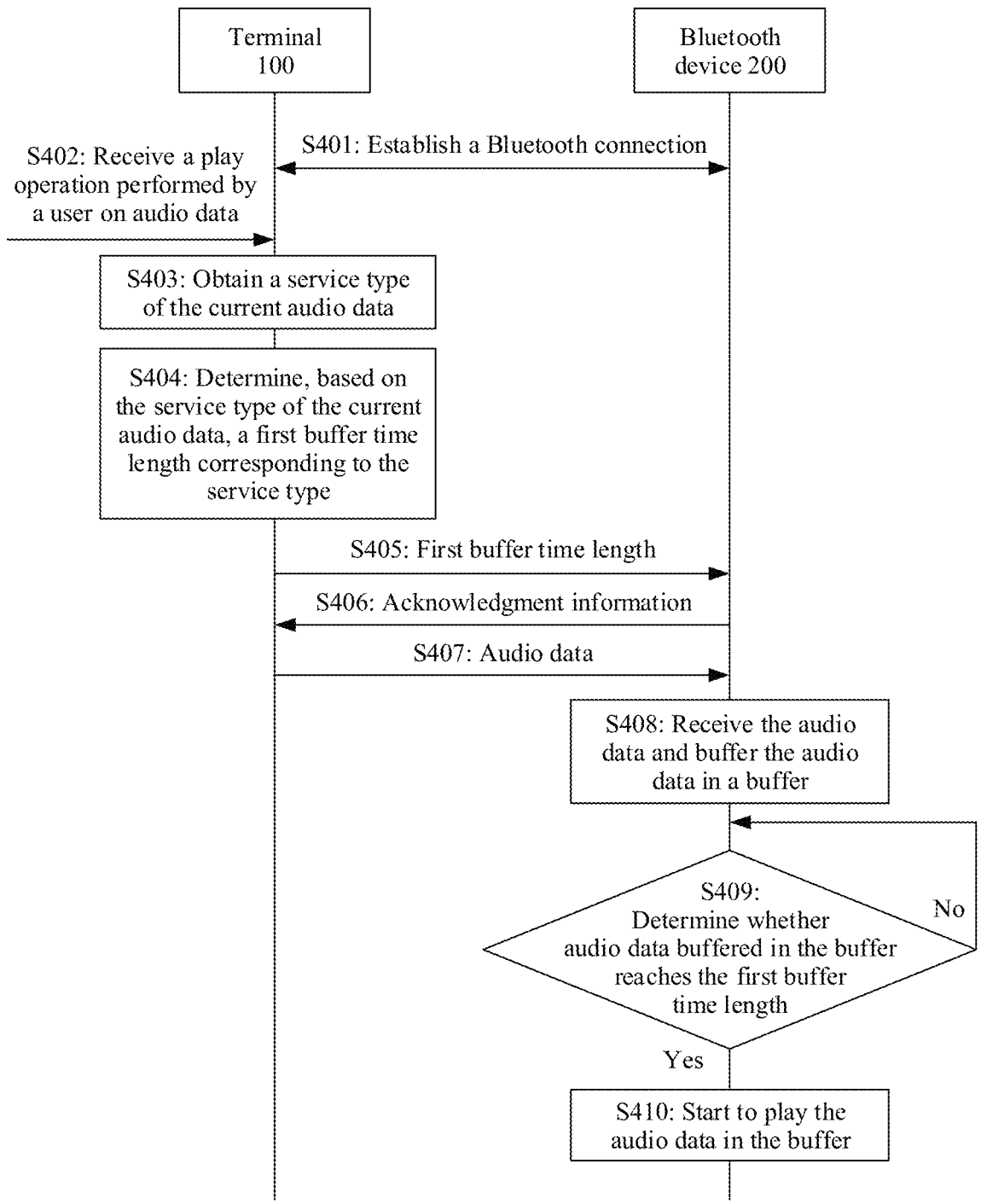
FIG. 4 is a schematic flowchart of a Bluetooth communication method according to an embodiment of this application.

Refer to FIG. 4. FIG. 4 shows a Bluetooth communication method according to an embodiment of this application. As shown in FIG. 4, the method further includes the following steps.

S401: A terminal 100 establishes a Bluetooth connection to a Bluetooth device 200.

The terminal 100 may establish the Bluetooth connection to the Bluetooth device 200 in the following manners.

1. When the terminal 100 is not paired with the Bluetooth device 200, after a Bluetooth function of the terminal 100 is enabled, the terminal 100 may send an inquiry request to surroundings. When the Bluetooth device 200 enters an inquiry scan state, the Bluetooth device 200 may scan the inquiry request sent by the terminal 100. After scanning the inquiry request from the terminal 100, the Bluetooth device 200 may return an inquiry response to the terminal 100. In this case, the terminal 100 may display a device option of the Bluetooth device 200 on a Bluetooth device interface. After a user selects the device option of the Bluetooth device 200, the terminal 100 may send a page request to the Bluetooth device 200. The Bluetooth device 200 may listen to the page request from the terminal 100 at a frequency hopping frequency in a fixed time window at a fixed periodicity. After obtaining the page request from the terminal 100 through listening, the Bluetooth device 200 may send a slave page response to the terminal 100 in a next time slot. After receiving the slave page response from the Bluetooth device 200, the terminal 100 may send a master page response to the Bluetooth device 200 in a next time slot. Then, the Bluetooth device 200 and the terminal 100 may enter a connected mode, establish an ACL link connection, and complete pairing authentication. After the terminal 100 and the Bluetooth device 200 complete pairing authentication, the connection (for example, a connection based on an audio/video distribution transport protocol (AVDTP)) used to transmit audio data may be established.

2. When the terminal 100 has been paired with the Bluetooth device 200, both the terminal 100 and the Bluetooth device 200 store a link key shared by the two parties. When the terminal 100 enables a Bluetooth function and the Bluetooth device 200 is powered on, the Bluetooth device 200 may actively send a page request to the terminal 100. The terminal 100 may listen to the page request from the Bluetooth device 200 at a frequency hopping frequency in a fixed time window at a fixed periodicity. After obtaining the page request from the Bluetooth device 200 through listening, the terminal 100 may send a slave page response to the Bluetooth device 200 in a next time slot. After receiving the slave page response from the terminal 100, the Bluetooth device 200 may send a master page response to the terminal 100 in a next time slot. Then, the terminal 100 and the Bluetooth device 200 may enter a connected mode, establish an ACL link connection, and complete link key authentication. After the terminal 100 and the Bluetooth device 200 complete authentication, the connection (for example, a connection based on an audio/video distribution transport protocol (AVDTP)) used to transmit audio data may be established.

S402: The terminal 100 receives an operation in which a user plays audio data.

S403: In response to the operation in which the user plays the audio data, the terminal 100 may obtain a service type of the audio data.

Figure 5A:
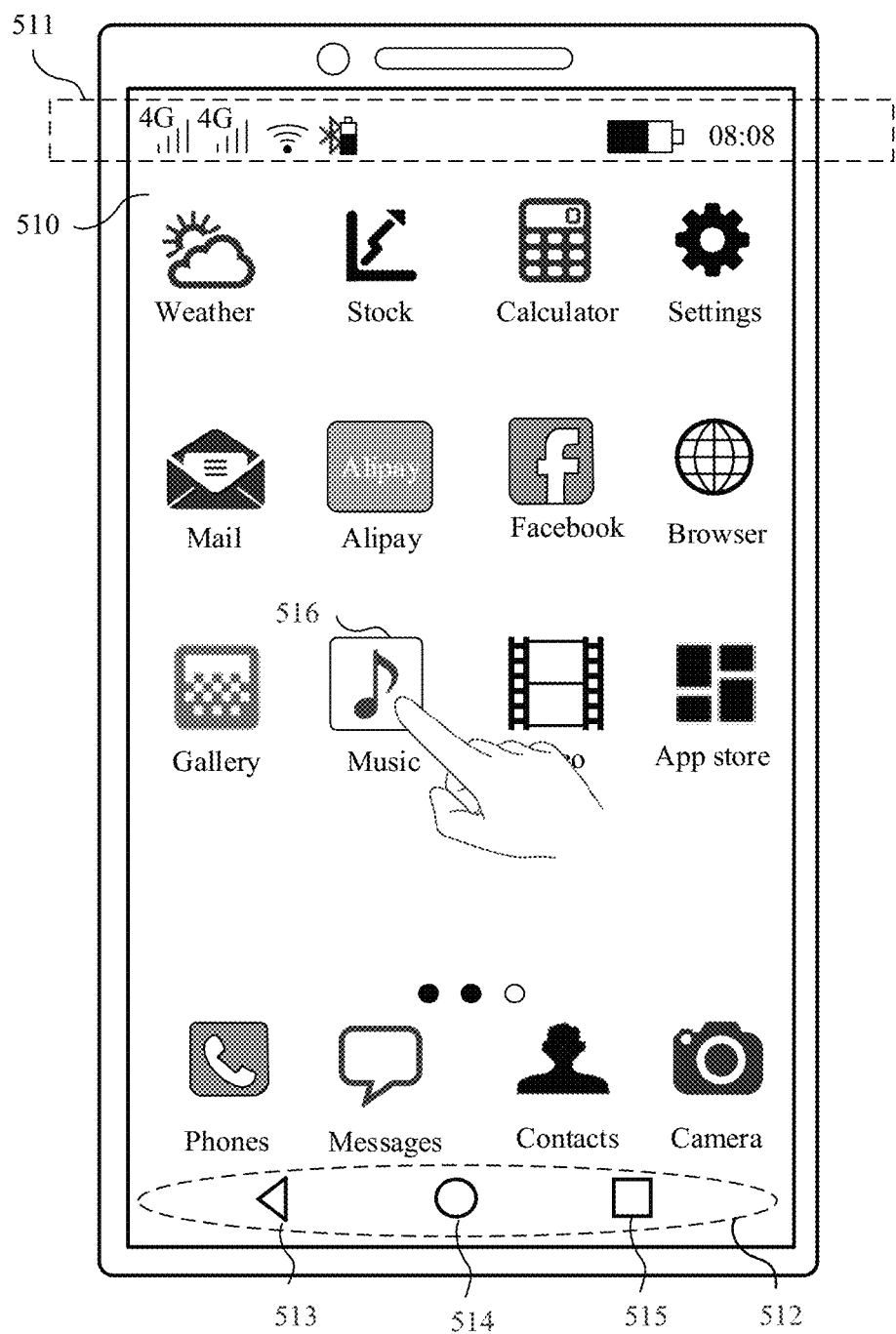
FIG. 5A and FIG. 5B are schematic diagrams of a group of interfaces according to an embodiment of this application.

For example, the service type of the audio data may be a music application service. As shown in FIG. 5A, the terminal 100 displays an interface 510 of a home screen. The interface 510 displays a page on which an application icon is placed, and the page includes a plurality of application icons (for example, a Weather application icon, a Stock application icon, a Calculator application icon, a Settings application icon, a Mail application icon, an Alipay application icon, a Facebook application icon, a Browser application icon, a Gallery application icon, a Music application icon, a Video application icon, and an APP store icon). A page indicator is further displayed below the plurality of application icons, to indicate a position relationship between a currently displayed page and another page. A plurality of tray icons (for example, a Phone application icon, a Messages application icon, a Contacts application icon, and a Camera application icon) are below the page indicator. The tray icons remain displayed when the page is switched, and the page may include a plurality of application icons and page indicators. Alternatively, the page indicator may not be a part of the page and may exist independently, and the tray icon is also optional. This is not limited in this embodiment of this application. A status bar 511 is displayed above the interface 510. The status bar 511 may include one or more signal strength indicators of a mobile communication signal (which may also be referred to as a cellular signal), one or more signal strength indicators of a wireless high-fidelity (Hi-Fi) signal, a power indicator of the Bluetooth device 200, a battery status indicator, a time indicator, and the like. A navigation bar 512 is displayed below the tray icon, and the navigation bar 512 may include system navigation buttons such as a Back button 513, a Home screen (button 514, and a Callout history button 515. When detecting that a user taps the Back button 513, the terminal 100 may display an upper-level page of a current page. When detecting that the user taps the Home screen button 514, the terminal 100 may display a home screen. When detecting that the user taps the Callout history button 515, the terminal 100 may display a task recently started by the user. Names of the navigation buttons may alternatively be other names. This is not limited in this application. In addition to a virtual button, each navigation button in the navigation bar 512 may alternatively be implemented as a physical button.

The terminal 100 may receive an input (for example, tap) operation performed by the user on the Music application icon 516. In response to the input operation performed on the Music application icon 516, the terminal 100 may display a music playing interface 520 shown in FIG. 5B.

Figure 5B:
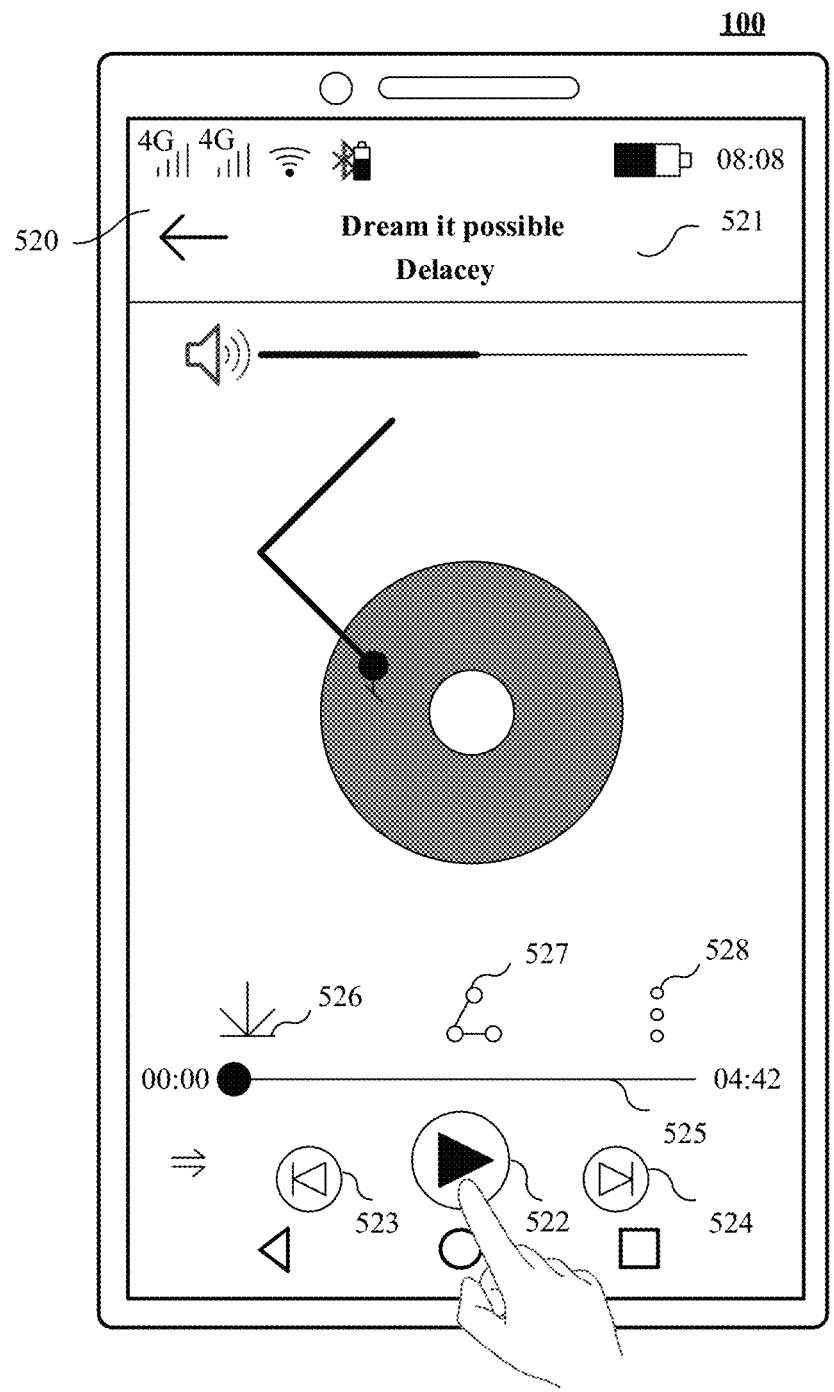

As shown in FIG. 5B, the music playing interface 520 includes a music name 521, a Play control 522, a Previous control 523, a Next control 524, a play progress bar 525, a Download control 526, a Share control 527, a More button 528, and the like. For example, the music name 521 may be "Dream it possible". The Play control 522 is configured to trigger the terminal 100 to play audio data corresponding to the music name 521. The Previous control 523 may be configured to trigger the terminal 100 to switch to previous audio data in a playlist for playing. The Next control 524 may be configured to trigger the terminal 100 to switch to next audio data in the playlist for playing. The play progress bar 525 may be used to indicate play progress of current audio data. The Download control 526 may be configured to trigger the terminal 100 to download and store the audio data corresponding to the music name 521 to a local storage medium. The Share control 527 may be configured to trigger the terminal 100 to share, to another application, a play link of the audio data corresponding to the music name 521. The More control 528 may be configured to trigger the terminal 100 to display more function controls related to music playing.

The terminal 100 may receive an input (for example, tap) operation performed by the user on the Play control 522. In response to the input operation, the terminal 100 obtains a service type of the audio data corresponding to the music name 521. The service type may include a music application service type, a video application service type, a game application service type, a voice call service type, and the like. Because the audio data corresponding to the music name 521 comes from the Music application, the audio data corresponding to the music name 521 may be a music application service type.

In a possible implementation, the terminal 100 may first obtain an application type of the audio data, and then determine the service type of the audio data. For example, the application type of the audio data includes a music application, a video application, a game application, and the like.

S404: The terminal 100 determines, based on the service type of the audio data, a first buffer time length corresponding to the service type.

The terminal 100 locally stores a correspondence between a service type and a buffer time length. Different service types correspond to different buffer time lengths. The buffer time length indicates time during which audio data buffered in a buffer of the Bluetooth device 200 can be played by using the Bluetooth device 200. An amount of data buffered in the buffer is a product of a buffer time length and an average play speed at which the Bluetooth device plays audio data. For example, when the buffer time length for the audio data in the buffer is 320 ms, and the average play speed at which the Bluetooth device plays the audio data is 192 kbps, the amount of the data buffered in the buffer is 61.44 kb (kilobits). The foregoing example is merely used to explain this application and shall not be construed as a limitation.

For a service type such as a game application or a video application, audio-to-video synchronization needs to be implemented, a low delay is required, and a jitter on the Bluetooth link cannot be resisted in a way in which the buffer of the Bluetooth device 200 buffers sufficient data. Therefore, for the service type such as the game application or the video application, a corresponding buffer time length can be set to be small, to reduce a play delay of the audio data. A service type such as a music application is not sensitive to a delay, but has a high requirement on smoothness, and a jitter on the Bluetooth link can be resisted in a way in which the buffer of the Bluetooth device 200 buffers sufficient data, so as to improve play smoothness of the audio data. Therefore, for the service type such as the music application, a corresponding buffer time length can be set to be large, to ensure play smoothness of the audio data.

In this embodiment of this application, the correspondence between a service type and a buffer time length may be shown in the following table:

TABLE 1

| Service type | Buffer time length |
| --- | --- |
| Music application service type | 320 ms |
| Video application service type | 160 ms |
| Game application service type | 80 ms |
| . . . | . . . |

For example, as shown in Table 1, the service type of the audio data may include but is not limited to the following types: the music application service type, the video application service type, the game application service type, a voice call service type, and the like. A buffer data amount corresponding to the music application service type may be 320 ms, the buffer time length corresponding to the video application service type may be 160 ms, and the buffer time length corresponding to the game application service type may be 80 ms. The foregoing example shown in Table 1 is merely used to explain this application and shall not be construed as a limitation.

The terminal 100 may find, from the correspondence between a service type and a buffer data amount based on the service type of the audio data, the first buffer time length corresponding to the service type of the audio data. For example, the service type of the audio data triggered by a user is the music application service type. It can be learned from Table 1 that the terminal 100 may determine that the first buffer time length is 320 ms.

S405: The terminal 100 sends the first buffer time length to the Bluetooth device 200.

After the terminal 100 determines the first buffer time length corresponding to the audio data, the terminal 100 may send the first buffer time length to the Bluetooth device 200 via Bluetooth.

In a possible implementation, after the terminal 100 obtains the service type corresponding to the current audio data, the terminal 100 may send indication information corresponding to the service type to the Bluetooth device 200. The indication information may be an identification number corresponding to the service type. After receiving the indication information that corresponds to the service type and that is sent by the terminal 100, the Bluetooth device 200 may determine, based on the indication information, the first buffer time length (for example, first duration) corresponding to the audio data. In this way, the Bluetooth device 200 can determine, by receiving only the indication information sent by the terminal 100, the time length for which the buffer needs to buffer the audio data.

S406: After receiving the first buffer time length, the Bluetooth device 200 may return acknowledgment information to the terminal 100, where the acknowledgment information is used to notify the terminal 100 that the Bluetooth device 200 has received the first buffer time length.

S407: The terminal 100 transmits the audio data to the Bluetooth device 200.

After receiving the acknowledgment information returned by the Bluetooth device 200, the terminal 100 may transmit the audio data to the Bluetooth device 200 through a Bluetooth data channel that has been established for transmitting the audio data.

S408: The Bluetooth device 200 receives the audio data transmitted by the terminal 100, and buffers the audio data in the buffer.

S409: The Bluetooth device 200 determines whether audio data buffered in the buffer reaches the first buffer time length. If the audio data buffered in the buffer reaches the first buffer time length, step S410 in which the Bluetooth device 200 starts to play the audio data is performed.

For example, before receiving the audio data transmitted by the terminal 100, the Bluetooth device 200 has received the first buffer time length corresponding to the audio data sent by the terminal 100. For example, the audio data may be of a music application service type, and the first time length corresponding to the audio data is 320 ms.

Figure 6A:
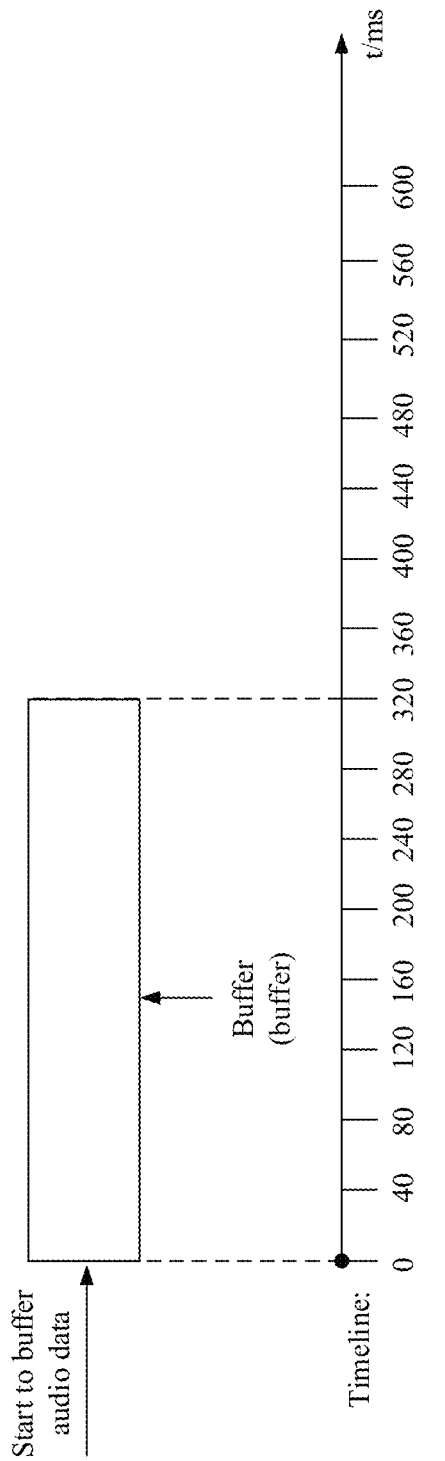
FIG. 6A to FIG. 6F are schematic diagrams of a group of scenarios in which a Bluetooth device buffers audio data according to an embodiment of this application.

As shown in FIG. 6A, after the terminal 100 receives the acknowledgment information returned by the Bluetooth device 200, the terminal 100 may start to transmit the audio data to the Bluetooth device 200. After receiving the audio data transmitted by the terminal 100, the Bluetooth device 200 may start to fill the audio data into the buffer.

Figure 6B:
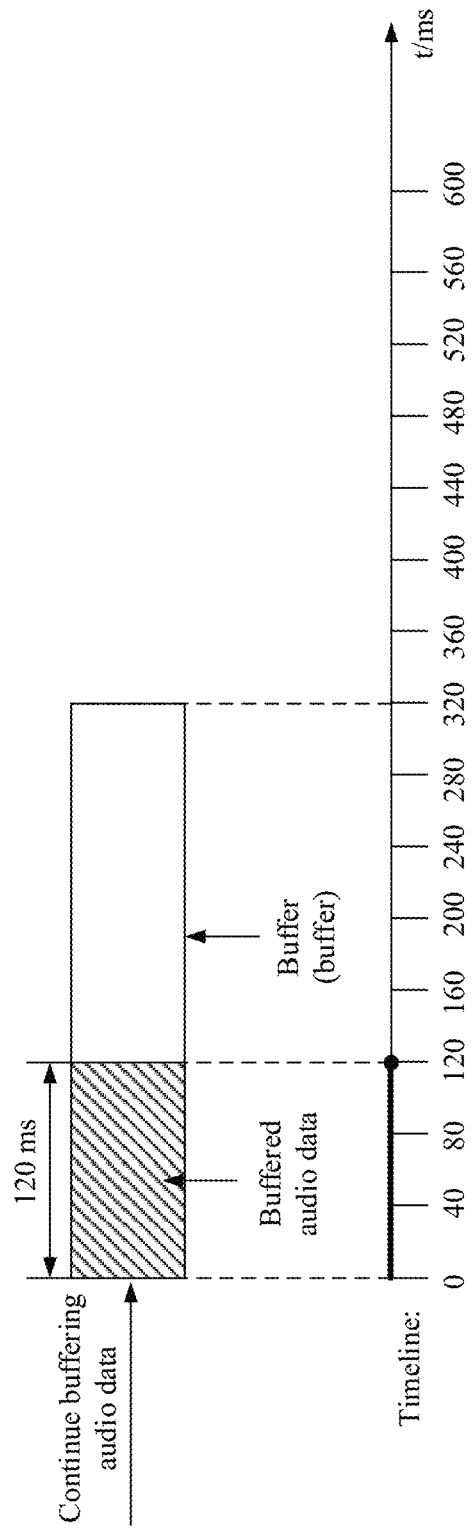

As shown in FIG. 6B, the Bluetooth device 200 may continue receiving audio data transmitted by the terminal 100 and storing the audio data in the buffer. A time length corresponding to audio data stored in the buffer of the Bluetooth device 200 is 120 ms, which does not reach the first buffer time length (for example, 320 ms). Therefore, the Bluetooth device 200 does not start to play the audio data, and continues receiving audio data transmitted by the terminal 100 and storing the audio data in the buffer.

Figure 6C:
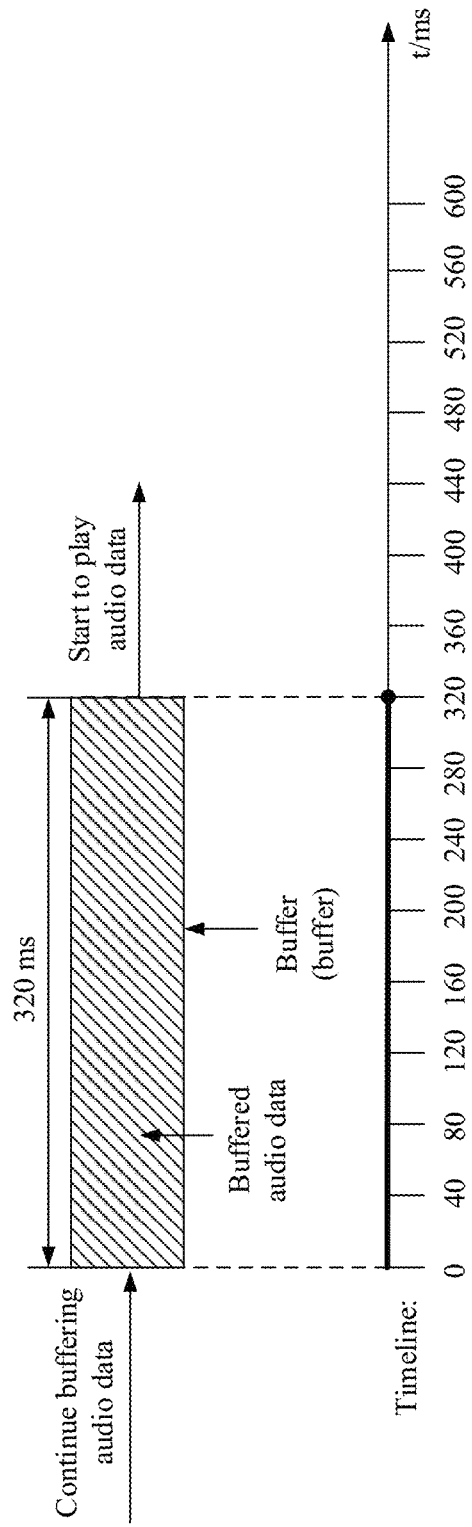

As shown in FIG. 6C, the Bluetooth device 200 may continue receiving audio data transmitted by the terminal 100 and storing the audio data in the buffer.

A time length corresponding to audio data stored in the buffer of the Bluetooth device 200 is 320 ms, which reaches the first buffer time length (for example, 320 ms). Therefore, the Bluetooth device 200 may start to play the audio data in the buffer. The Bluetooth device 200 fetches, according to a rule that audio data is first stored and first fetched in the buffer, audio data buffered in the buffer for decoding first, and then plays the decoded audio data.

Figure 6D:
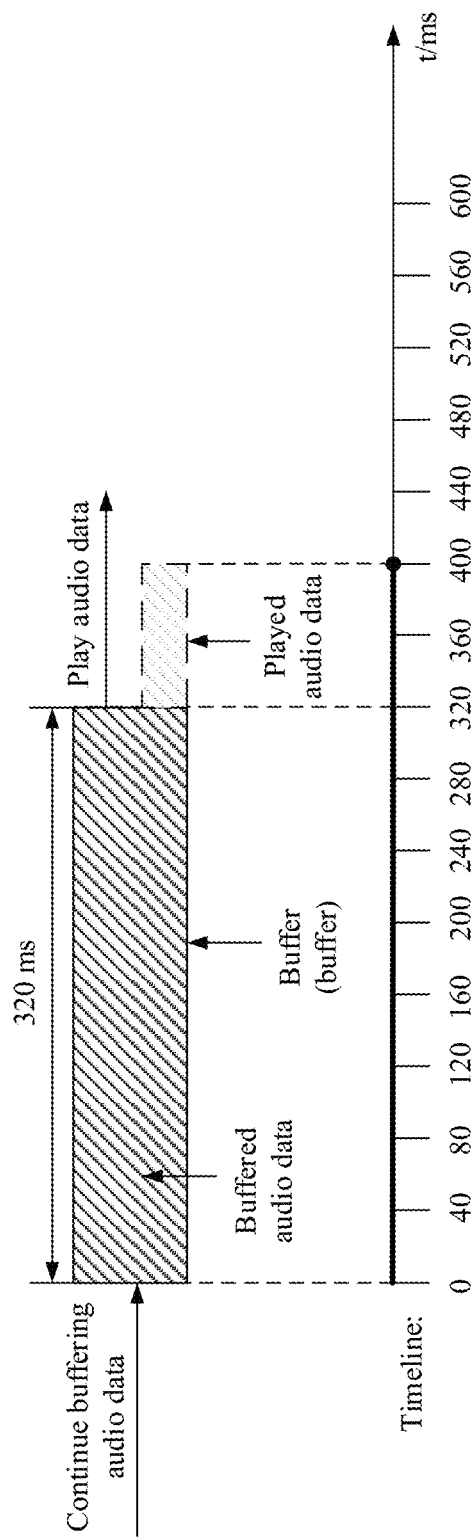

As shown in FIG. 6D, the Bluetooth device 200 may continue receiving audio data transmitted by the terminal 100 and storing the audio data in the buffer. The Bluetooth device 200 also continues playing audio data buffered in the buffer. The time length corresponding to the audio data in the buffer is 320 ms. The Bluetooth device 200 has played audio data for 80 ms.

Figure 6E:
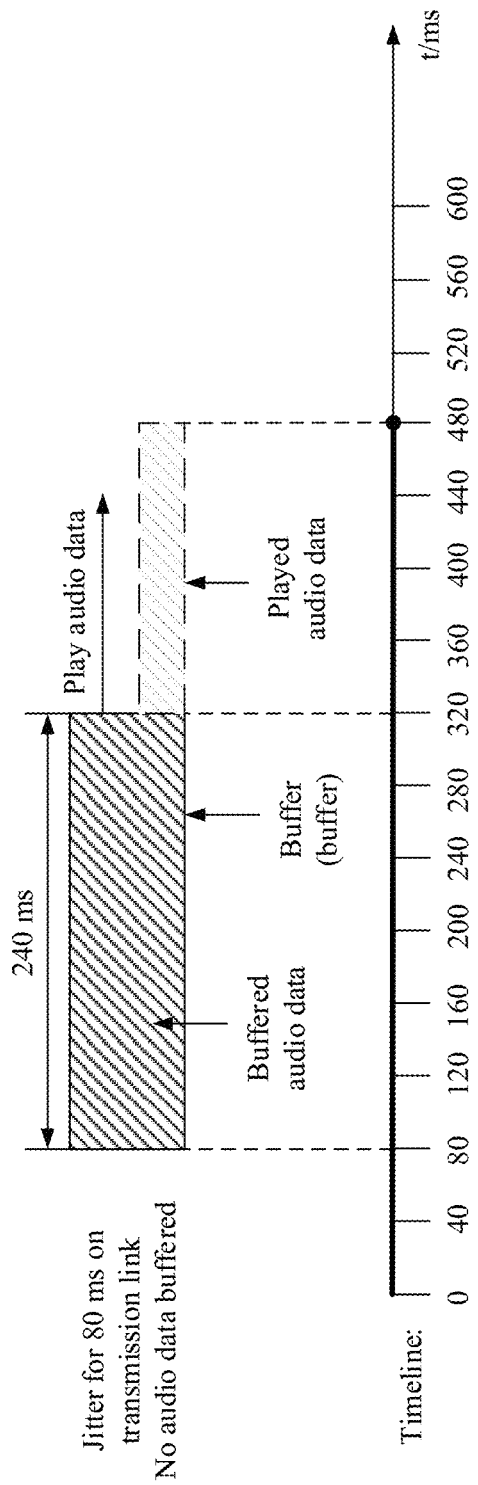

As shown in FIG. 6E, when a jitter occurs on a Bluetooth transmission link between the Bluetooth device 200 and the terminal 100, audio data transmitted by the terminal 100 to the Bluetooth device 200 is interrupted. For example, the Bluetooth device 200 does not receive for 80 ms, due to the jitter on the Bluetooth transmission link, audio data transmitted by the terminal 100. The buffer of the Bluetooth device 200 does not buffer new audio data for 80 ms. As a result, only buffered audio data of 240 ms remains in the buffer. However, the Bluetooth device 200 continues playing the audio data buffered in the buffer within the 80 ms in which the jitter occurs on the Bluetooth transmission link. Therefore, it can be ensured that, in a way in which a sufficient amount of audio data is buffered in the buffer, the Bluetooth device 200 can still continuously play the audio data when the jitter occurs on the Bluetooth transmission link.

Figure 6F:
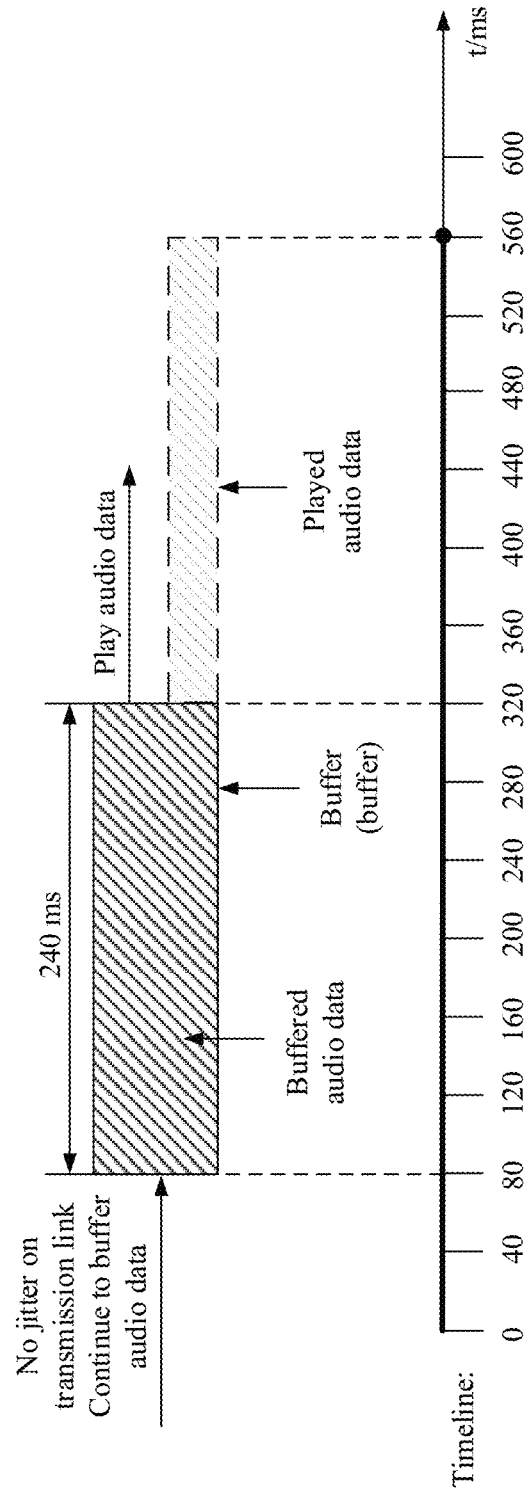

As shown in FIG. 6F, when the Bluetooth transmission link between the Bluetooth device 200 and the terminal 100 resumes normally without the jitter, the terminal 100 may continue to transmit audio data to the Bluetooth device 200. After receiving the audio data transmitted by the terminal 100, the Bluetooth device 200 may continue to buffer newly received audio data in the buffer. Due to the previous link jitter, a time length corresponding to audio data in the buffer is shortened to be 240 ms.

The foregoing example shown in FIG. 6A to FIG. 6F is merely used to explain this application and shall not be construed as a limitation.

In some embodiments, when the terminal 100 receives a play operation performed by a user on first audio data, the terminal 100 may identify that a service type of the first audio data is a first service type (for example, a music application service type), and the terminal 100 may send first indication information to the Bluetooth device 200. After receiving the first indication information, the Bluetooth device 200 may set a buffer time length corresponding to the first audio data to a first duration (for example, 320 ms) based on the first indication information.

For example, after the Bluetooth device 200 starts to play the first audio data, if the terminal 100 receives a play operation performed by the user on second audio data, the terminal 100 may identify that a service type of the second audio data is a second service type (for example, a game application service type). The terminal 100 may send second indication information to the Bluetooth device 200. After receiving the second indication information, the Bluetooth device 200 sets a buffer time length corresponding to the second audio data to second duration (for example, 80 ms) based on the second indication information. Before buffering the second audio data, the terminal 100 may clear the first audio data buffered in the buffer.

According to the Bluetooth communication method provided in this embodiment of this application, the terminal 100 can set different buffer time lengths for audio data of different service types in the buffer of the Bluetooth device 200 based on service types of the audio data. The Bluetooth device 200 starts to play the audio data in the buffer only when an amount of data buffered in the buffer of the Bluetooth device 200 reaches the specified buffer time length. In this way, the terminal can perform targeted delay control on audio data playback of the Bluetooth device 200 in different application scenarios. This meets delay requirements for audio data playback performed by the terminal 100 through the Bluetooth device 200 in different scenarios, and improves user experience.

Figure 7A:
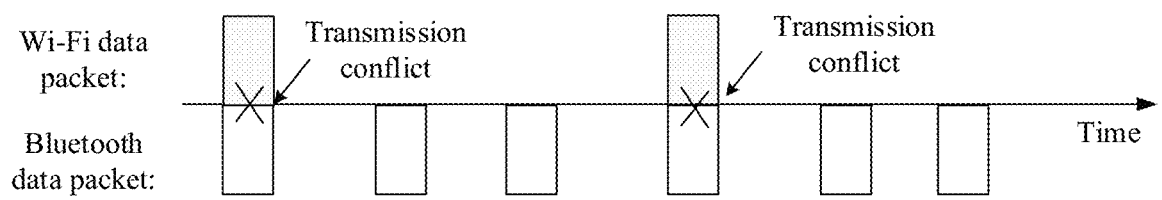
FIG. 7A is a schematic diagram of data transmission when a Bluetooth packet aggregation transmission mechanism is disabled according to an embodiment of this application.

In some application scenarios, because a wireless local area network (WLAN) module and a Bluetooth module on the terminal 100 are integrated in a same chip, when both a WLAN function and a Bluetooth function of the terminal 100 are enabled, the chip integrating the WLAN module and the Bluetooth module can send only one data packet in a same timeslot. For example, as shown in FIG. 7A, when both a Bluetooth data packet and a WLAN data packet need to be sent by the chip, a conflict occurs during transmission of the Bluetooth data packet and the WLAN data packet. The terminal 100 may usually set transmission priorities for the Bluetooth data packet and the WLAN data packet. When a transmission priority for the Bluetooth data packet is higher than a transmission priority for the WLAN data packet, if both the Bluetooth data packet and the WLAN data packet need to be sent by the chip, the chip preferably sends the Bluetooth data packet. This interrupts transmission of the WLAN data packet, and affects transmission efficiency of the WLAN data packet.

Figure 7B:
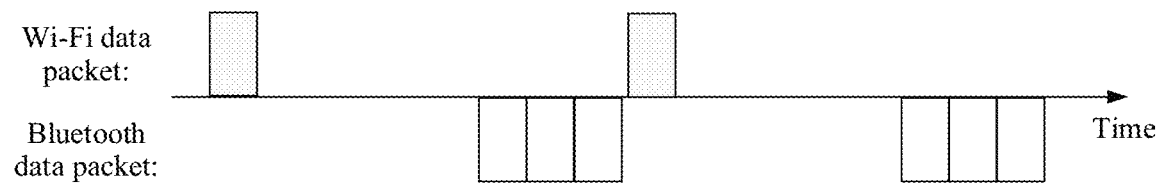
FIG. 7B is a schematic diagram of data transmission when a Bluetooth packet aggregation transmission mechanism is enabled according to an embodiment of this application.

To reduce a probability of interrupting sending of the WLAN data packet by the terminal 100, the terminal 100 may enable a packet aggregation mechanism on Bluetooth data. For example, as shown in FIG. 7B, after the terminal 100 enables the Bluetooth packet aggregation mechanism, the terminal 100 may aggregate a specific quantity of Bluetooth data packets before sending the Bluetooth data packets. For example, the terminal 100 may aggregate every three Bluetooth data packets and then send the Bluetooth data packets together. In a possible implementation, the terminal 100 may alternatively aggregate Bluetooth data packets within a specific time and then send the Bluetooth data packets together. For example, the terminal 100 may aggregate Bluetooth data packets within every 50 ms and then send the Bluetooth data packets together.

The Bluetooth packet aggregation mechanism can be used to reduce the probability of interrupting transmission of the WLAN data packet, and improve transmission efficiency of the WLAN data packet. However, in some application scenarios, for example, when the terminal 100 runs a game application, because when the terminal 100 runs the game application, a user more needs to hear a sound synchronized with an image displayed on the terminal 100, the Bluetooth device 200 needs to have a low delay when playing the audio data. Because the terminal 100 transmits the audio data by using the packet aggregation mechanism, the terminal 100 needs to spend time aggregating a plurality of data packets before sending the data packets together. This increases the delay of playing the audio data by using the Bluetooth device 200. In some other application scenarios, for example, when the terminal 100 runs a music application, because a user is not sensitive to a delay when the terminal 100 runs the music application, the user pays more attention to continuity of sounds output by the Bluetooth device 200. If the terminal 100 does not use the packet aggregation mechanism, because the WLAN function is enabled, when the terminal 100 transmits the Bluetooth data packet, there is a high probability of interrupting transmission of the WLAN data packet. This reduces a WLAN transmission rate and affects user experience.

Therefore, embodiments of this application provide a Bluetooth communication method. A terminal 100 may determine, based on a service type of audio data, whether to use a packet aggregation transmission mechanism. This meets requirements of playing the audio data by the terminal 100 by using a Bluetooth device 200 in different scenarios, and improves user experience.

The following describes the Bluetooth communication method provided in this application.

Figure 8:
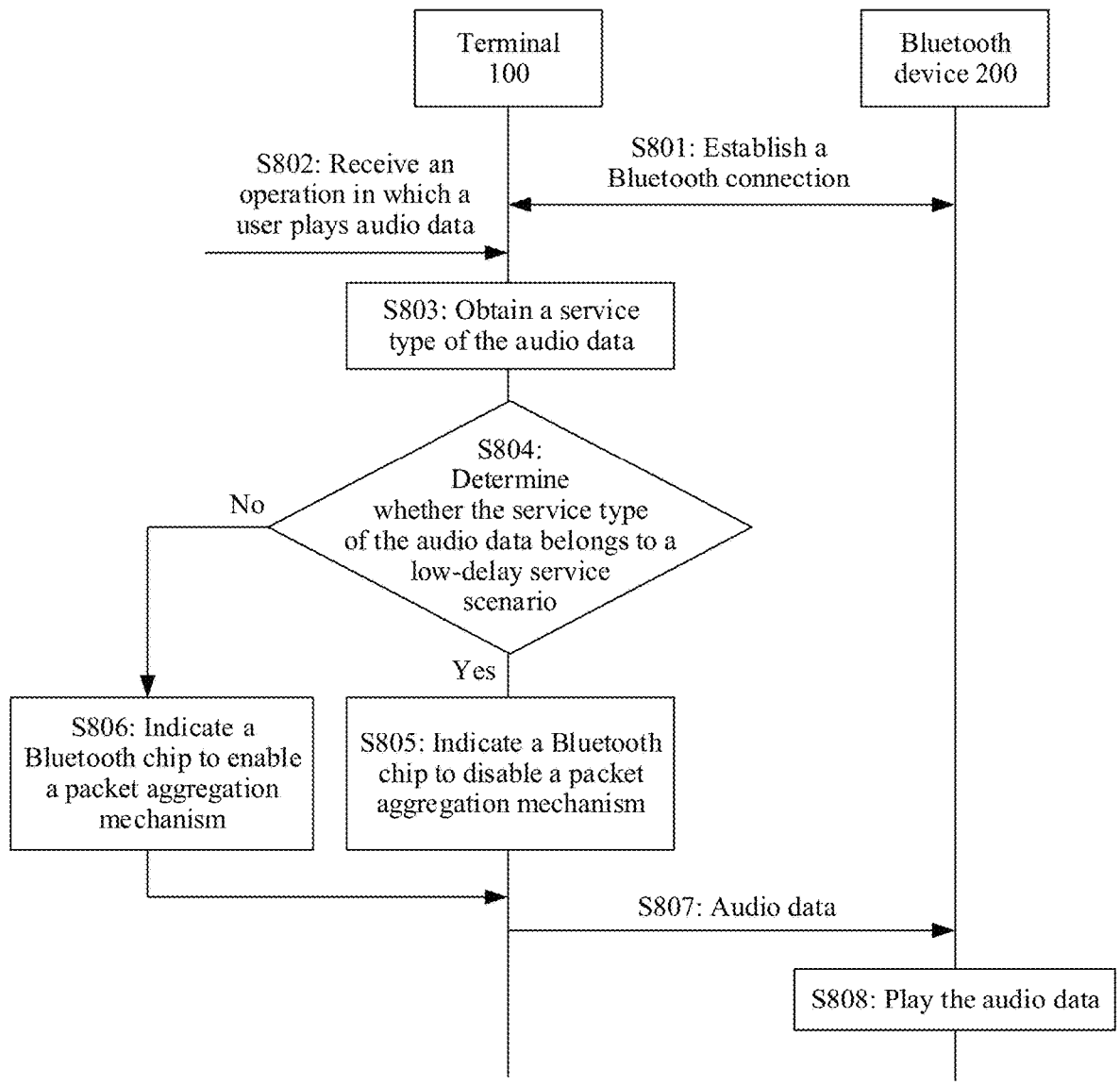
FIG. 8 is a schematic flowchart of a Bluetooth communication method according to another embodiment of this application.

Refer to FIG. 8. FIG. 8 shows a Bluetooth communication method according to an embodiment of this application. As shown in FIG. 8, the method further includes the following steps.

S801: A terminal 100 establishes a Bluetooth connection to a Bluetooth device 200.

For specific content, refer to step S401 in the embodiment shown in FIG. 4. Details are not described herein again.

S802: The terminal 100 receives an operation in which a user plays audio data.

For specific content, refer to step S402 in the embodiment shown in FIG. 4. Details are not described herein again.

S803: In response to the operation in which the user plays the audio data, the terminal 100 may obtain a service type of the audio data.

For specific content, refer to step S403 in the embodiment shown in FIG. 4. Details are not described herein again.

S804: The terminal 100 determines whether the service type of the audio data belongs to a low-delay service scenario. If the service type of the audio data belongs to the low-delay service scenario, step S805 in which the terminal 100 indicates a Bluetooth chip to disable a packet aggregation transmission mechanism is performed. If the service type of the audio data does not belong to the low-delay service scenario, step S806 in which the terminal 100 indicates a Bluetooth chip to enable a packet aggregation transmission mechanism is performed.

A service scenario may include a low-delay service scenario and a high-voice-quality service scenario. In the low-delay service scenario, a low delay is required when audio data is played. Therefore, when the terminal 100 sends the audio data to the Bluetooth device 200 via Bluetooth, the packet aggregation transmission mechanism may be disabled to reduce delay. In the high-voice-quality service scenario, high smoothness is required when audio data is played. Therefore, when the terminal 100 sends the audio data to the Bluetooth device 200 via Bluetooth, the packet aggregation transmission mechanism may be enabled to reduce interference of Bluetooth transmission corresponding to a WLAN signal, and improve voice quality of the audio data played by using the Bluetooth device 200.

The terminal 100 stores a correspondence between a service type and a service scenario. After obtaining the service type of the audio data, the terminal 100 may query, from the correspondence between a service type and a service scenario based on the service type of the audio data, a service scenario corresponding to the service type of the audio data.

For example, a correspondence between a service type and a service scenario may be shown in Table 2.

TABLE 2

| Service scenario | Service type |
| --- | --- |
| Low delay | Video application service type<br>Game application service type<br>. . . |
| High voice quality | Music application service type<br>. . . |

It can be learned from Table 2 that service types included in the low-delay service scenario include the video application service type, the game application service type, and the like. Service types included in the high-voice-quality service scenario include the music application service type and the like. Table 2 is merely used to explain this application and shall not be construed as a limitation.

For example, if the service type of the audio data is the game application service type, the terminal 100 may determine that the service scenario corresponding to the audio data is the low-delay service scenario. Therefore, the terminal 100 can indicate the Bluetooth chip to disable the packet aggregation transmission mechanism, to reduce the delay. If the service type of the audio data is the music application service type, the terminal 100 may determine that the audio data is in the high-voice-quality service scenario. Therefore, the terminal 100 can indicate the Bluetooth chip to enable the packet aggregation transmission mechanism, to improve voice quality of the audio data played by using the Bluetooth device 200.

S807: The terminal 100 transmits the audio data to the Bluetooth device 200.

When the terminal 100 determines that the service type of the audio data belongs to the low-delay service scenario, the terminal 100 may disable the packet aggregation transmission mechanism and transmit the audio data to the Bluetooth device 200. When the terminal 100 determines that the service type of the audio data does not belong to the low-delay service scenario, the terminal 100 may enable the packet aggregation transmission mechanism and transmit the audio data to the Bluetooth device 200.

S808: The Bluetooth device 200 plays the audio data sent by the terminal 100.

When receiving the audio data transmitted by the terminal 100, the Bluetooth device 200 may play the received audio data.

In this embodiment of this application, after the Bluetooth chip on the terminal 100 enables the packet aggregation transmission mechanism, the terminal 100 may aggregate a specified quantity of (for example, 5) Bluetooth data packets, and then send the Bluetooth data packets to the Bluetooth device 200. Alternatively, the terminal 100 may send Bluetooth data packets aggregated within a specified period of time (for example, 30 ms) at intervals of a specified period of time.

In a possible implementation, after obtaining the service type of the audio data, the terminal 100 may determine, based on the service type, a first quantity of aggregated packets corresponding to the service type. Then, each time aggregating the first quantity of aggregated Bluetooth data packets, the terminal 100 may send the Bluetooth data packets together to the Bluetooth device 200.

In a possible implementation, after obtaining the service type of the audio data, the terminal 100 may determine, based on the service type, first packet aggregation duration corresponding to the service type. Then, the terminal 100 may send, to the Bluetooth device 200 at intervals of the first packet aggregation duration (for example, 40 ms), Bluetooth data packets aggregated within the first packet aggregation duration.

In embodiments of this application, the embodiment shown in FIG. 4 and the embodiment shown in FIG. 8 may be combined with each other. After the terminal 100 obtains the service type of the audio data, before the terminal 100 sends the audio data to the Bluetooth device 200, the terminal 100 may send indication information corresponding to the service type to the Bluetooth device 200. The Bluetooth device may set, based on the indication information, the buffer time length corresponding to the audio data to duration corresponding to the service type.

After obtaining the service type of the audio data, the terminal 100 may further determine whether the service type of the audio data belongs to the low-delay service scenario. When the service type of the audio data belongs to the low-delay service scenario, the terminal 100 may disable the packet aggregation transmission mechanism and transmit the audio data to the Bluetooth device 200. When receiving the audio data transmitted by the terminal 100, the Bluetooth device 200 may buffer the received audio data in the buffer. When audio data buffered in the buffer reaches the buffer time length (for example, 80 ms) corresponding to the service type (for example, a game application service type), the Bluetooth device 200 starts to play the audio data in the buffer.

When the service type of the audio data does not belong to the low-delay service scenario, the terminal 100 may enable the packet aggregation transmission mechanism and transmit the audio data to the Bluetooth device 200. When receiving the audio data transmitted by the terminal 100, the Bluetooth device 200 may buffer the received audio data in the buffer. When audio data buffered in the buffer reaches the buffer time length (for example, 320 ms) corresponding to the service type (for example, a music application service type), the Bluetooth device 200 starts to play the audio data in the buffer.

In a case in which the embodiment in FIG. 4 and the embodiment in FIG. 8 are combined, the terminal 100 can perform targeted delay control on audio data playback of the Bluetooth device 200 in different application scenarios. This meets delay requirements for audio data playback performed by the terminal 100 through the Bluetooth device 200 in different scenarios, and improves user experience.

The following describes a schematic diagram of a framework of a Bluetooth communications system according to an embodiment of this application.

Figure 9:
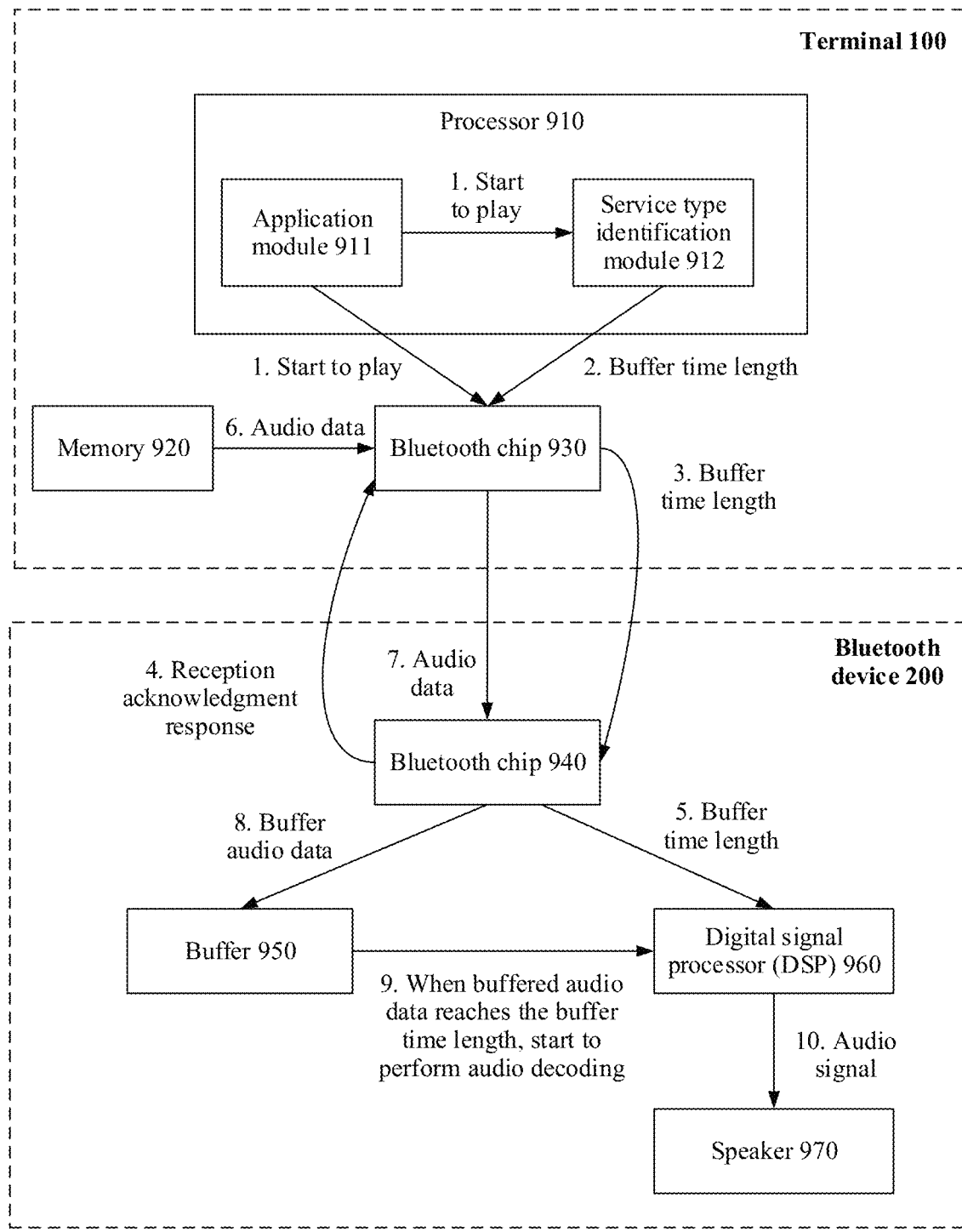
FIG. 9 is a schematic diagram of an architecture of a Bluetooth communications system according to an embodiment of this application.

As shown in FIG. 9, the Bluetooth communications system 900 may include a terminal 100 and a Bluetooth device 200. The terminal 100 may include but is not limited to a processor 910, a memory 920, and a Bluetooth chip 930. The processor 910 may run an application module 911 and a service type identification module 912. The memory 920 stores audio data of the application module 911. The Bluetooth device 200 may include but is not limited to a Bluetooth chip 940, a buffer 950, a digital signal processor (DSP) 960, and a speaker 970.

1. When the processor 910 runs the application module 911, if an instruction for playing the audio data is received, the application module 911 may send a play start instruction to the service type identification module 912 and the Bluetooth chip 930 that are run by the processor 910.
2. When running the service type identification module 912, the processor 910 may identify a service type of the audio data, and find a buffer time length corresponding to the service type. Then, the processor 910 may send the buffer time length to the Bluetooth chip 930.
3. After receiving the buffer time length sent by the processor 910, the Bluetooth chip 930 on the terminal 100 may send the buffer time length to the Bluetooth chip 940 on the Bluetooth device 200 through an established Bluetooth link.
4. After receiving the buffer time length, the Bluetooth chip 940 on the Bluetooth device 200 may return a reception acknowledgment response to the Bluetooth chip 930 on the terminal 100.
5. After receiving the buffer time length, the Bluetooth chip 940 on the Bluetooth device 200 may set the buffer time length on the digital signal processor 960.

6-7. After receiving the reception acknowledgment response, the Bluetooth chip 930 on the terminal 100 may transmit the audio data stored in the memory 920 to the Bluetooth chip 940 on the Bluetooth device 200.

8. The Bluetooth chip 940 on the Bluetooth device 200 may buffer the received audio data into the buffer 950.

9. The digital signal processor 960 may monitor an audio data buffer condition in the buffer 950. When buffered audio data reaches the buffer time length, the digital signal processor 960 starts to perform audio decoding on the audio data in the buffer 950.

10. The digital signal processor 960 may output a decoded audio signal to the speaker 970. The speaker 970 outputs a sound according to the decoded audio signal.

For a part that is not described in detail in this embodiment of this application, refer to the embodiment shown in FIG. 4. Details are not described herein again.

According to a Bluetooth communication method provided in this embodiment of this application, the terminal 100 can set different buffer time lengths for audio data of different service types in the buffer of the Bluetooth device 200 based on service types of the audio data. The Bluetooth device 200 starts to play the audio data in the buffer only when an amount of data buffered in the buffer of the Bluetooth device 200 reaches the specified buffer time length. In this way, the terminal can perform targeted delay control on audio data playback of the Bluetooth device 200 in different application scenarios. This meets delay requirements for audio data playback performed by the terminal 100 through the Bluetooth device 200 in different scenarios, and improves user experience.

The following describes a schematic diagram of a framework of a Bluetooth communications system according to an embodiment of this application.

Figure 10:
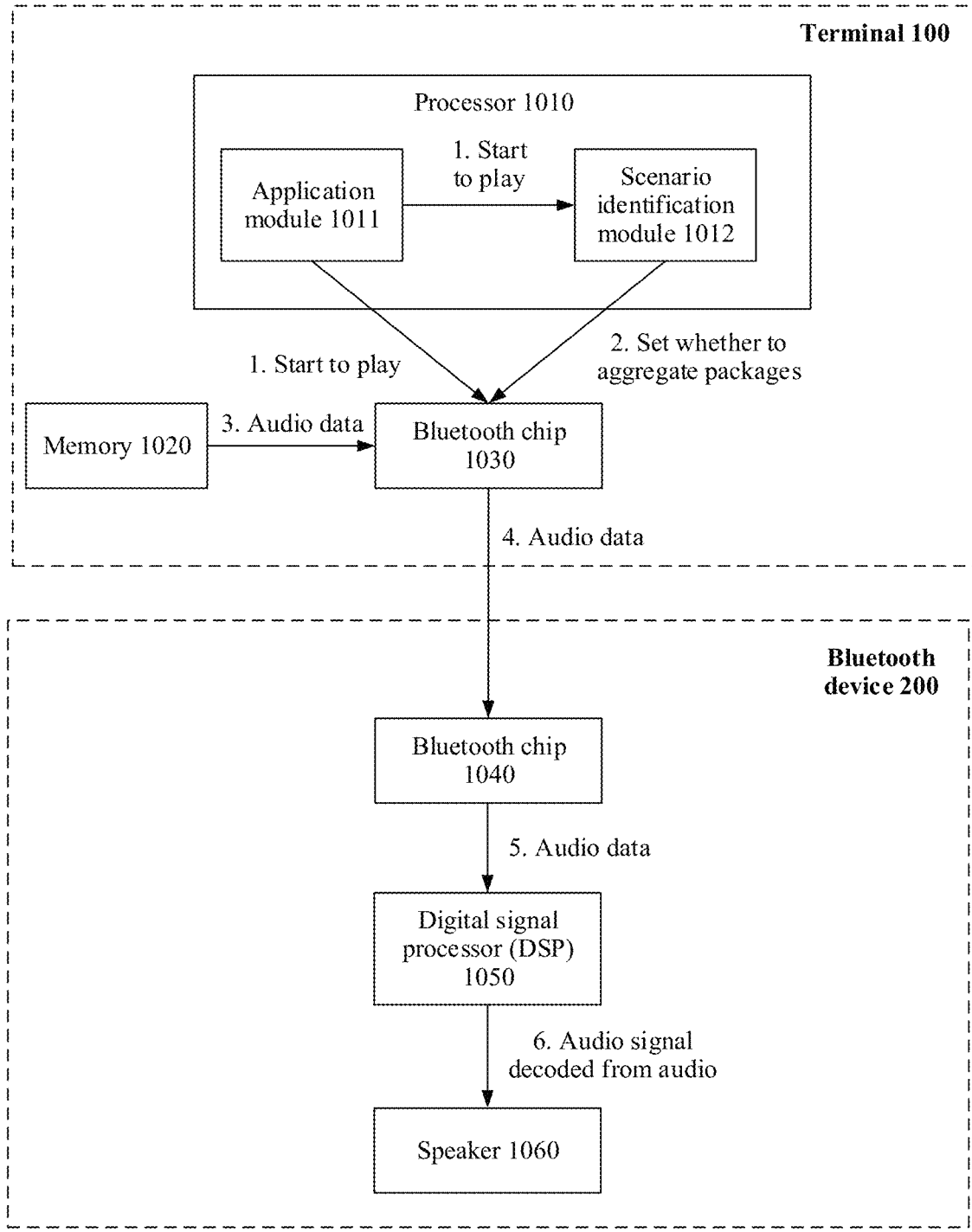
FIG. 10 is a schematic diagram of an architecture of a Bluetooth communications system according to another embodiment of this application.

As shown in FIG. 10, the Bluetooth communications system 1000 may include a terminal 100 and a Bluetooth device 200. The terminal 100 may include but is not limited to a processor 1010, a memory 1020, and a Bluetooth chip 1030. The processor 1010 may run an application module 1011 and a service type identification module 1012. The memory 1020 stores audio data of the application module 1011. The Bluetooth device 200 may include but is not limited to a Bluetooth chip 1040, a digital signal processor (digital signal processor, DSP) 1050, and a speaker 1060.

1. When the processor 1010 runs the application module 1011, if an instruction for playing the audio data is received, the application module 1011 may send a play start instruction to the scenario identification module 1012 and the Bluetooth chip 1030 that are run by the processor 1010.

2. When running the scenario identification module 1012, the processor 1010 may identify a service scenario of the audio data, and determine whether to perform packet aggregation transmission. Then, the processor 1010 may send a packet aggregation transmission setting instruction to the Bluetooth chip 1030. The packet aggregation transmission setting instruction is used to instruct the Bluetooth chip 1030 to enable/disable a packet aggregation transmission mechanism during data transmission.

3. The Bluetooth chip 1030 may obtain the audio data of the application module 1011 from the memory 1020.

4. The Bluetooth chip 1030 on the terminal 100 enables/disables the packet aggregation transmission mechanism, and transmits the audio data to the Bluetooth chip 1040 on the Bluetooth device 200.

5. After receiving the audio data, the Bluetooth chip 1040 on the Bluetooth device 200 may send the audio data to the digital signal processor 1050 for audio decoding.

6. The digital signal processor 1050 may output a decoded audio signal to the speaker 1060. The speaker 1060 outputs a sound according to the decoded audio signal.

For a part that is not described in detail in this embodiment of this application, refer to the embodiment shown in FIG. 8. Details are not described herein again.

In this embodiment of this application, the terminal 100 may determine, based on the service type of audio data, whether to use the packet aggregation transmission mechanism. This meets requirements of playing the audio data by the terminal 100 by using a Bluetooth device 200 in different scenarios, and improves user experience.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A Bluetooth communication method applied to a Bluetooth system comprising a terminal and a Bluetooth device, the method comprising:
   receiving, by the terminal, a play operation performed by a user on first audio data;
   sending, by the terminal, to the Bluetooth device first indication information used by the Bluetooth device to set a buffer time length for the first audio data to a first duration, wherein the first audio data is of a first service type and the first indication information includes an indication of the first service type;
   receiving, by the Bluetooth device, the first audio data sent by the terminal via Bluetooth;
   buffering, by the Bluetooth device, the first audio data for the first duration based on the first service type; and
   starting, by the Bluetooth device, to play the buffered first audio data after the buffer time length for the first audio data reaches the first duration.

2. The method according to claim 1, wherein after starting, by the Bluetooth device, to play the buffered first audio data, the method further comprises:
   receiving, by the terminal, a play operation performed by the user on second audio data;
   sending, by the terminal, to the Bluetooth device second indication information used by the Bluetooth device to set a buffer time length for the second audio data to a second duration, wherein the second audio data is of a second service type and the second indication information includes an indication of the second service type; and
   after the buffer time length for the second audio data reaches the second duration, starting, by the Bluetooth device, to play the second audio data buffered in a buffer.

3. The method according to claim 1, wherein the method further comprises:
   sending, by the Bluetooth device, acknowledgment information to the terminal after the Bluetooth device receives the first indication information sent by the terminal; and sending, by the terminal, the first audio data to the Bluetooth device via Bluetooth in response to the acknowledgment information.

4. The method according to claim 1, wherein after starting, by the Bluetooth device, to play the first audio data, the method further comprises:
    detecting, by the Bluetooth device, that transmission of the first audio data is interrupted, and continuing, by the Bluetooth device, to play the buffered first audio data.

5. The method according to claim 4, wherein the method further comprises:
    detecting, by the Bluetooth device, that the transmission of the first audio data has resumed after detecting the interruption, and continuing, by the Bluetooth device, to buffer the first audio data and play the buffered first audio data.

6. The method according to claim 1, wherein the method further comprises:
    determining that a service scenario of the first audio data is a low-delay service scenario, and disabling, by the terminal, a Bluetooth packet aggregation transmission mechanism while sending the first audio data to the Bluetooth device.

7. The method according to claim 1, wherein the method further comprises:
    enabling, by the terminal, a Bluetooth packet aggregation transmission mechanism while sending the first audio data to the Bluetooth device, wherein a service scenario of the first audio data is not a low-delay service scenario.

8. A Bluetooth system comprising:
    a terminal and a Bluetooth device, wherein
    the terminal is configured to receive a play operation performed by a user on first audio data;
    the terminal is further configured to send first indication information to the Bluetooth device wherein a service type of the first audio data is a first service type, wherein the first indication information is used by the Bluetooth device to set a buffer time length for the audio data to a first duration, and wherein the first audio data is of a first service type and the first indication information includes an indication of the first service type;
    the Bluetooth device is configured to receive the first audio data sent by the terminal via Bluetooth;
    the Bluetooth device is configured to buffer the first audio data for the first duration based on the first service type; and
    the Bluetooth device is further configured to start to play the buffered first audio data after the buffer time length for the first audio data reaches the first duration.

9. The Bluetooth system according to claim 8, wherein the terminal is further configured to:
    receive a play operation performed by the user on second audio data after the Bluetooth device has started to play the buffered first audio data, and
    send to the Bluetooth device second indication information used by the Bluetooth device to set buffer time length for the second audio data to a second duration, wherein the second audio data is of a second service type and the second indication information includes an indication of the second service type; and
    the Bluetooth device is further configured to, after the buffer time length for the second audio data reaches the second duration, start to play the second audio data buffered in a buffer.

10. The Bluetooth system according to claim 8, wherein the Bluetooth device is further configured to send acknowledgment information to the terminal after receiving the first indication information sent by the terminal; and
    the terminal is further configured to send the first audio data to the Bluetooth device via Bluetooth in response to the acknowledgment information.

11. The Bluetooth system according to claim 8, wherein the Bluetooth device is further configured to:
    continue playing the buffered first audio data after detecting that transmission of the first audio data has been interrupted.

12. The Bluetooth system according to claim 11, wherein the Bluetooth device is further configured to:
    detect that the transmission of the first audio data has resumed after detecting the interruption, continue to buffer the first audio data, and continue to play the buffered first audio data.

13. The Bluetooth system according to claim 8, wherein the terminal is further configured to:
    determine that a service scenario of the first audio data is a low-delay service scenario, and disable a Bluetooth packet aggregation transmission mechanism while sending the first audio data to the Bluetooth device.

14. The Bluetooth system according to claim 8, wherein the terminal is further configured to:
    enable a Bluetooth packet aggregation transmission mechanism while sending the first audio data to the Bluetooth device.

* * * * *